(12) United States Patent
Liu et al.

(10) Patent No.: US 11,054,440 B2
(45) Date of Patent: Jul. 6, 2021

(54) DEVICE INTEGRATED WITH SCANNING PROBE FOR OPTICAL NANOFOCUSING AND NEAR-FIELD OPTICAL IMAGING

(71) Applicant: THE REGENTS OF THE UNIVERSITY OF CALIFORNIA, Oakland, CA (US)

(72) Inventors: Ming Liu, Riverside, CA (US); Ruoxue Yan, Riverside, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

(21) Appl. No.: 16/834,326

(22) Filed: Mar. 30, 2020

(65) Prior Publication Data

US 2020/0309815 A1    Oct. 1, 2020

Related U.S. Application Data

(60) Provisional application No. 62/825,519, filed on Mar. 28, 2019.

(51) Int. Cl.
| | | |
|---|---|---|
| *G01Q 20/02* | (2010.01) | |
| *G01Q 60/16* | (2010.01) | |
| *G01Q 60/22* | (2010.01) | |
| *G01Q 60/38* | (2010.01) | |
| *G01Q 30/02* | (2010.01) | |

(52) U.S. Cl.
CPC ............ *G01Q 20/02* (2013.01); *G01Q 30/02* (2013.01); *G01Q 60/16* (2013.01); *G01Q 60/22* (2013.01); *G01Q 60/38* (2013.01)

(58) Field of Classification Search
CPC ........ G01Q 60/00; G01Q 60/18; G01Q 60/20; G01Q 60/22; G01Q 20/00; G01Q 20/02; G01Q 30/00; G01Q 30/02; G01Q 70/00; G01Q 70/08; G01Q 70/10; G01Q 70/12; G01Q 70/14; G01Q 70/16
USPC ......... 850/21, 30, 31, 32, 52, 56, 57, 58, 59
See application file for complete search history.

(56) References Cited

U.S. PATENT DOCUMENTS

2006/0257090 A1* 11/2006 Podolskiy .............. G02B 6/107
                                                                     385/129
2012/0051691 A1*  3/2012 Zhang ................. G01C 19/721
                                                                      385/14

OTHER PUBLICATIONS

Amenabar et al., "Hyperspectral Infrared Nanoimaging of Organic Samples Based on Fourier Transform Infrared Nanospectroscopy", Nature Communications, vol. 8, Article No. 14402, Feb. 15, 2017, pp. 1-10.

Amenabar et al., "Structural Analysis and Mapping of Individual Protein Complexes by Infrared Nanospectroscopy", Nature Communications, vol. 4, Article No. 2890, Dec. 4, 2013, pp. 1-9.

(Continued)

*Primary Examiner* — Nicole M Ippolito
(74) *Attorney, Agent, or Firm* — Buchanan Ingersoll & Rooney PC

(57) ABSTRACT

A method for generating a high-intensity light source at a probe tip, the method includes exciting a $TM_0$ mode of a surface plasmon polariton (SPP) in a sharp-tip metal nanowire (AgNW) waveguide with a linearly-polarized mode ($LP_{01}$) in a tapered optical fiber (OF); and compressing the $TM_0$ mode through a chemically-sharpened taper to a tip apex of the sharp-tip silver nanowire (AgNW).

19 Claims, 22 Drawing Sheets

(56) References Cited

OTHER PUBLICATIONS

Bao et al., "Mapping Local Charge Recombination Heterogeneity by Multidimensional Nanospectroscopic Imaging", Science, vol. 338, Dec. 7, 2012, pp. 1317-1321.

Barthes et al., "A Coupled Lossy Local-Mode Theory Description of a Plasmonic Tip", New Journal of Physics, vol. 14, Aug. 31, 2012, pp. 1-19.

Becker et al., "Gap-Plasmon-Enhanced Nanofocusing Near-Field Microscopy", ACS Photonics, vol. 3, 2016, pp. 223-232.

Bedell et al., "Strain Scaling for CMOS", Materials Research Society, vol. 39, Feb. 2014, pp. 131-138.

Benz et al., "Single-Molecule Optomechanics in Picocavities", Science, vol. 354, Issue No. 6313, Nov. 11, 2016, pp. 726-729.

Berweger et al., "Adiabatic Tip-Plasmon Focusing for Nano-Raman Spectroscopy", The Journal of Physical Chemistry Letters, vol. 1, Nov. 19, 2010, pp. 3427-3432.

Betzig et al., "Breaking the Diffraction Barrier: Optical Microscopy on a Nanometric Scale", Science, vol. 251, Mar. 22, 1991, pp. 1468-1470.

Blancon et al., "Direct Measurement of the Absolute Absorption Spectrum of Individual Semiconducting Single-Wall Carbon Nanotubes", Nature Communicatiuons, vol. 4, Article No. 2542, Sep. 27, 2013, pp. 1-8.

Bouhelier et al., "Plasmon-Coupled Tip-Enhanced Near-Field Optical Microscopy", Journal of Microscopy, vol. 210, 2003, pp. 220-224.

Burresi et al., "Probing the Magnetic Field of Light at Optical Frequencies", Science, vol. 326, Oct. 23, 2009, pp. 550-553.

Chen et al., "Highly Efficient Interfacing of Guided Plasmons and Photons in Nanowires", Nano Letters, vol. 9, No. 11, 2009, pp. 3756-3761.

Choi et al., "Compressing Surface Plasmons for Nano-Scale Optical Focusing", Optics Express, vol. 17, No. 9, Apr. 22, 2009, pp. 7519-7524.

Choo et al., "Nanofocusing in a Metal—Insulator—Metal Gap Plasmon Waveguide with a Three-Dimensional Linear Taper", Nature Photonics, vol. 6, Nov. 18, 2012, pp. 838-844.

Chuang Shunl., "Physics of Optoelectronic Devices", John Wiley & Sons, Ltd., 1995, 730 pages.

Dukovic et al., "Structural Dependence of Excitonic Optical Transitions and Band-Gap Energies in Carbon Nanotubes", Nano Letters, vol. 5, No. 11, 2005, pp. 2314-2318.

Edwards et al., "Fast, High-Resolution Atomic Force Microscopy Using a Quartz Tuning Fork as Actuator and Sensor", Journal of Applied Physics, vol. 82, Jun. 4, 1998, pp. 980-984.

Falvo et al., "Bending and Buckling of carbon Nanotubes Under Large Strain", Nature, vol. 389, Oct. 9, 1997, pp. 582-584.

Fujiwara Hiroyuki, "Spectroscopic Ellipsometry: Principles and Applications", John Wiley & Sons, Ltd., 2007, 388 pages.

Giugni et al., "Hot-Electron Nanoscopy using Adiabatic Compression of Surface Plasmons", Nature Nanotechnology, vol. 8, Oct. 20, 2013, pp. 845-852.

Gramotnev et al., "Optimized Nonadiabatic Nanofocusing of Plasmons by Tapered Metal Rods", Journal of Applied Physics, vol. 104, Aug. 8, 2008, pp. 1-9.

Gramotnev et al., "Plasmonics Beyond the Diffraction Limit", Nature Photonics, vol. 4, Jan. 29, 2010, pp. 83-91.

Hertel et al., "Manipulation of Individual Carbon Nanotubes and Their Interaction with Surfaces", The Journal of Physical Chemistry B, vol. 102, No. 6, 1998, pp. 910-915.

Hillenbrand et al., "Phonon-Enhanced Light—Matter Interaction at the Nanometre Scale", Nature, vol. 418, Jul. 11, 2002, pp. 159-162.

Hsu et al., "Tip-Sample Interaction in a Shear-Force Near-Field Scanning Optical Microscope", Review of Scientific Instruments, vol. 70, No. 9, Sep. 1999, pp. 3609-3613.

Issa et al., "Optical Nanofocusing on Tapered Metallic Waveguides", Plasmonics, vol. 2, 2007, pp. 31-37.

Janunts et al., "Excitation and Superfocusing of Surface Plasmon Polaritons on a Silver-Coated Optical Fiber Tip", Optics Communications, vol. 253, 2005, pp. 118-124.

Jiang et al., "Near-Field Plasmonic Probe with Super Resolution and High Throughput and Signal-to-Noise Ratio", Nano Letters, vol. 18, Dec. 27, 2017, pp. 881-885.

Joh et al., "Single-Walled Carbon Nanotubes as Excitonic Optical Wires", Nature Nanotechnology, vol. 6, Dec. 19, 2010, pp. 51-56.

Kataura et al., "Optical Properties of Single-Walled Carbon Nanotubes", Synthetic Metals, vol. 103, 1999, pp. 2555-2558.

Kawata et al., "Plasmonics for Near-Field Nano-Imaging and Superlensing", Nature Photonics, vol. 3, Jun. 29, 2009, pp. 388-394.

Keilmann F., "Surface-Polariton Propagation for Scanning Near-® Eld Optical Microscopy Application", Journal of Microscopy, vol. 194, May-Jun. 1999, pp. 567-570.

Khatib et al., "Far Infrared Synchrotron Near-Field Nanoimaging and Nanospectroscopy", ACS Photonics, vol. 5, May 11, 2018, pp. 2773-2779.

Kim et al., "High External-Efficiency Nanofocusing for Lens-Free Near-Field Optical Nanoscopy", Nature Photonics, vol. 13, Sep. 2019, pp. 636-643.

Kravtsov et al., "Plasmonic Nanofocused Four-Wave Mixing for Femtosecond Near-Field Imaging", Nature Nanotechnology, vol. 11, Feb. 8, 2016, pp. 459-465.

Leeuw et al., "Strain Measurements on Individual Single-Walled Carbon Nanotubes in a Polymer Host: Structure-Dependent Spectral Shifts and Load Transfer", Nano Letters, vol. 8, No. 3, 2008, pp. 826. 831.

Liao et al., "Tip-Enhanced Raman Spectroscopic Imaging of Individual Carbon Nanotubes with Subnanometer Resolution", Nano Letters, vol. 16, Jun. 27, 2016, pp. 4040-4046.

Liu et al., "High-Throughput Optical Imaging and Spectroscopy of Individual Carbon Nanotubes in Devices", Nature Nanotechnology, vol. 8, Nov. 10, 2013, pp. 917-922.

Ma et al., "Toward High-Contrast Atomic Force Microscopy-Tip-Enhanced Raman Spectroscopy Imaging: Nanoantenna-Mediated Remote- Excitation on Sharp-Tip Silver Nanowire Probes", Nano Letters, vol. 19, 2019, pp. 100-107.

Maultzsch et al., "Exciton Binding Energies in Carbon Nanotubes from Two-Photon Photoluminescence", Physical Review B, vol. 72, 2005, pp. 1-4.

Minot et al., "Tuning Carbon Nanotube Band Gaps with Strain", Physical Review Letters, vol. 90, No. 15, Article No. 156401, Apr. 18, 2003, pp. 1-4.

Nerkararyan KH.V., "Superfocusing of a Surface Polariton in a Wedge-Like Structure", Physics Letters A, vol. 237, Dec. 29, 1997, pp. 103-105.

Novotny et al., "Antennas for Light", Nature Photonics, vol. 5, Feb. 1, 2011, pp. 83-90.

Novotny Lukas, "Strong Coupling, Energy Splitting, and Level Crossings: A Classical Perspective", American Journal of Physics, vol. 78, No. 11, Nov. 2010, pp. 1199-1202.

Novotny Lukas, "The History of Near-field Optics", Progress in Optics, vol. 50, Chapter 5, 2007, pp. 137-184.

Pile et al., "Adiabatic and Nonadiabatic Nanofocusing of Plasmons by Tapered Gap Plasmon Waveguides", Applied Physics Letters, vol. 89, Jul. 25, 2006, pp. 1-4.

Pisanec et al., "Optical Phonons in Carbon Nanotubes: Kohn Anomalies, Peierls Distortions, and Dynamic Effects", Physical Review B, vol. 75, Jan. 31, 2007, pp. 1-22.

Raether Heinz, "Surface Plasmons on Smooth Surfaces", Surface Plasmons on Smooth and Rough Surfaces and on Gratings, Springer, 1988.

Ropers et al., "Grating-Coupling of Surface Plasmons onto Metallic Tips: A Nanoconfined Light Source", Nano Letters, vol. 7, No. 9, 2007, pp. 2784-2788.

Rotenberg et al., "Mapping Nanoscale Light Fields", Nature Photonics, vol. 8, Nov. 27, 2014, pp. 919-926.

Schmid et al., "Nanoscale Chemical Imaging Using Tip-Enhanced Raman Spectroscopy: A Critical Review", Angewandte Chemie International Edition, vol. 52, 2013, pp. 5940-5954.

Schnell et al., "Nanofocusing of Mid-Infrared Energy with Tapered Transmission Lines", Nature Photonics, vol. 5, Apr. 4, 2011, pp. 283-287.

(56) References Cited

OTHER PUBLICATIONS

Schuller et al., "Plasmonics for Extreme Light Concentration and Manipulation", Nature Materials, vol. 9, Feb. 19, 2010, pp. 193-204.
Sfeir et al., "Probing Electronic Transitions in Individual Carbon Nanotubes by Rayleigh Scattering", Science, vol. 306, Jul. 19, 2004, pp. 1540-15443.
Shi et al., "Amplitude—and Phase-Resolved Nanospectral Imaging of Phonon Polaritons in Hexagonal Boron Nitride", ACS Photonics, vol. 2, Jun. 9, 2015, pp. 790-796.
Sonntag et al., "Recent Advances in Tip-Enhanced Raman Spectroscopy", The Journal of Physical Chemistry Letters, vol. 5, Aug. 27, 2014, pp. 3125-3130.
Srituravanich et al., "Flying Plasmonic Lens in the Near Field for High-Speed Nanolithography", Nature Nanotechnology, vol. 3, Oct. 12, 2008, pp. 733-737.
Stockman Marki., "Nanofocusing of Optical Energy in Tapered PlasmonicWaveguides", Physical Review Letters, vol. 93, No. 13, Sep. 23, 2004, pp. 1-4.
Tugchin et al., "Plasmonic Tip Based on Excitation of Radially Polarized Conical Surface Plasmon Polariton for Detecting Longitudinal and Transversal Fields", ACS Photonics, vol. 2, Oct. 5, 2015, pp. 1468-1475.
Tuniz et al., "Broadband Efficient Directional Coupling to Short-Range Plasmons: Towards Hybrid Fiber Nanotips", Optics Express, vol. 24, No. 7, Mar. 29, 2016, pp. 7507-7524.
Tuniz et al., "Hybrid-Mode-Assisted Long-Distance Excitation of Short-Range Surface Plasmons in a Nanotip-Enhanced Step-Index Fiber", Nano Letters, vol. 17, Dec. 16, 2016, pp. 631-637.
Vernon et al., "Adiabatic Nanofocusing of Plasmons by a Sharp Metal Wedge on a Dielectric Substrate", Journal of Applied Physics, vol. 101, May 22, 2007, pp. 1-11.
Vitanov et al., "Coherent Manipulation of Atoms and Molecules by Sequential Lase Pulses", Advances in Atomic, Molecular, and Optical Physics, vol. 46, 2001, pp. 55-190.
Wang et al., "High Transmission Nanoscale Bowtie-Shaped Aperture Probe for Near-Field Optical Imaging", Applied Physics Letters, vol. 90, Jun. 25, 2007, pp. 1-4.
Wang et al., "Plasmonic Nearfield Scanning Probe with High Transmission", Nano Letters, vol. 8, No. 9, 2008, pp. 3041-3045.
Wang et al., "The Optical Resonances in Carbon Nanotubes Arise from Excitons", Science, vol. 308, Article No. 5723, Sep. 9, 2005, pp. 838-841.
Wu et al., "High-Spatial-Resolution Mapping of Catalytic Reactions on Single Particles", Research Letter, vol. 541, Jan. 26, 2017, pp. 511-526.
Yang et al., "Electronic Structure of Deformed Carbon Nanotubes", Physical Review Letters vol. 85, No. 1, Jul. 3, 2000, pp. 154-157.
Yano et al., "Tip-Enhanced Nano-Raman Analytical Imaging of Locally Induced Strain Distribution in Carbon Nanotubes", Nature Communication, vol. 4, Article No. 2592, Oct. 7, 2013, pp. 1-7.
Yeo et al., "Tip-Enhanced Raman Spectroscopy—Its Status, Challenges and Future Directions", Chemical Physics Letters, vol. 472, 2009, pp. 1-13.
Zhao et al., "Nanoscopic Control and Quantification of Enantioselective Optical Forces", Nature Nanotechnology, vol. 12, Sep. 25, 2017, pp. 1055-1060.

\* cited by examiner

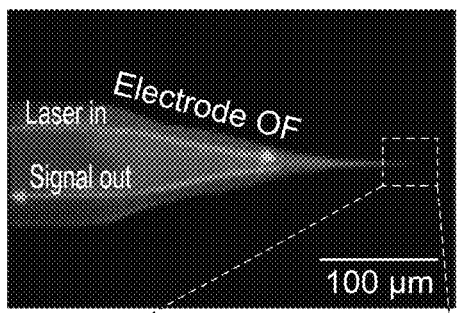
FIG. 1A
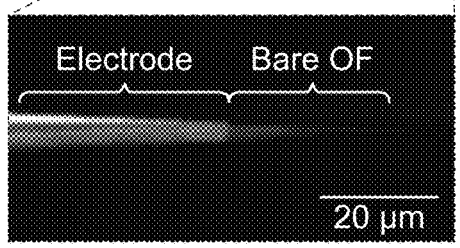
FIG. 1B
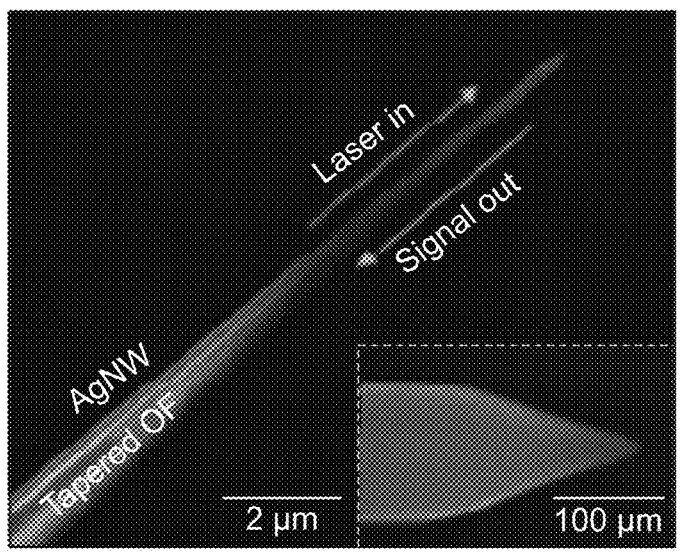
FIG. 1C
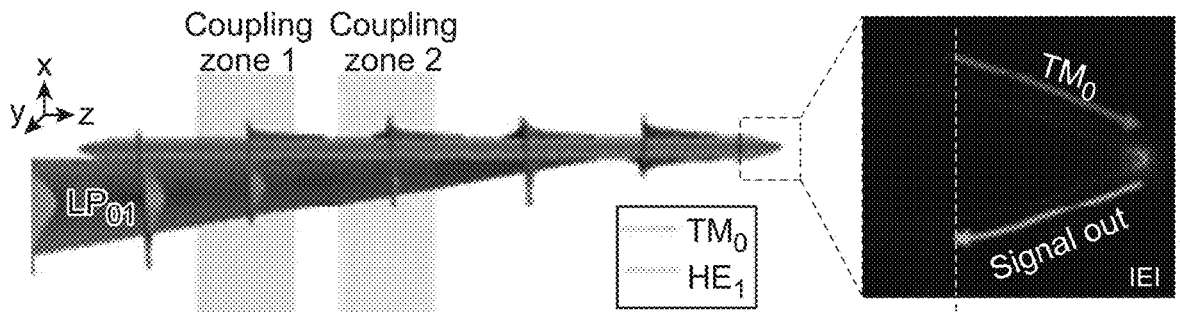
FIG. 1D
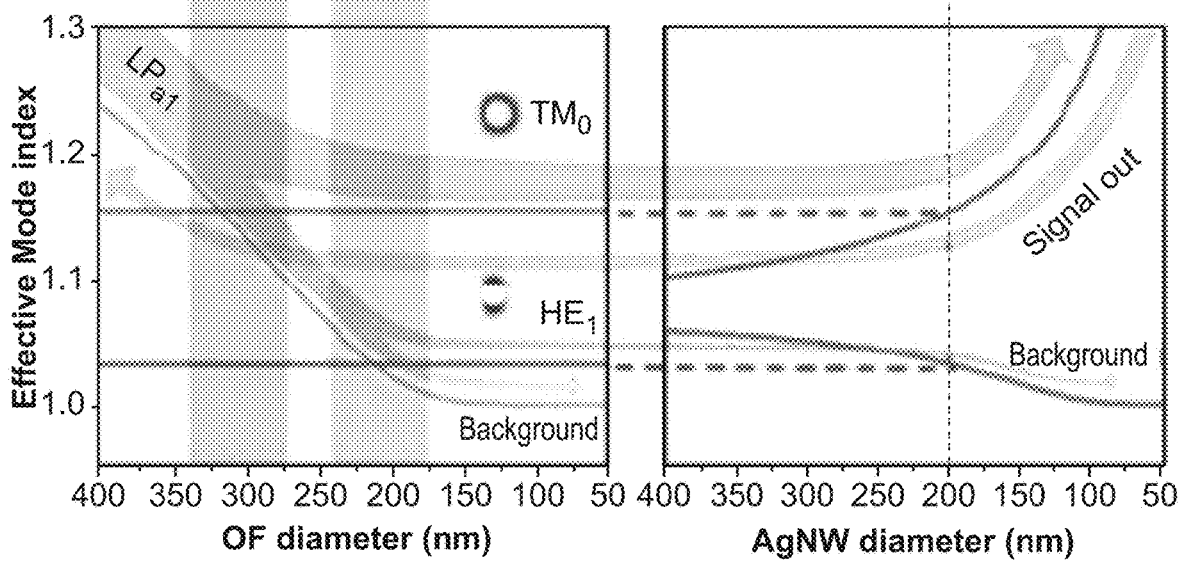
FIG. 1E
FIG. 1F

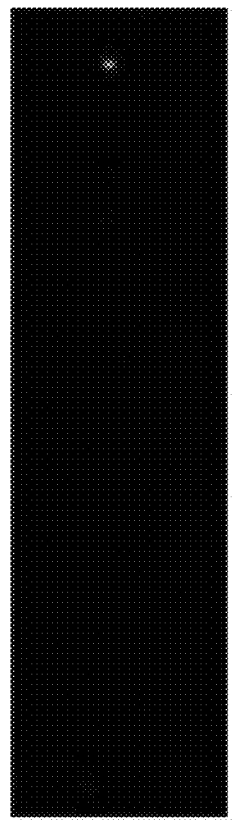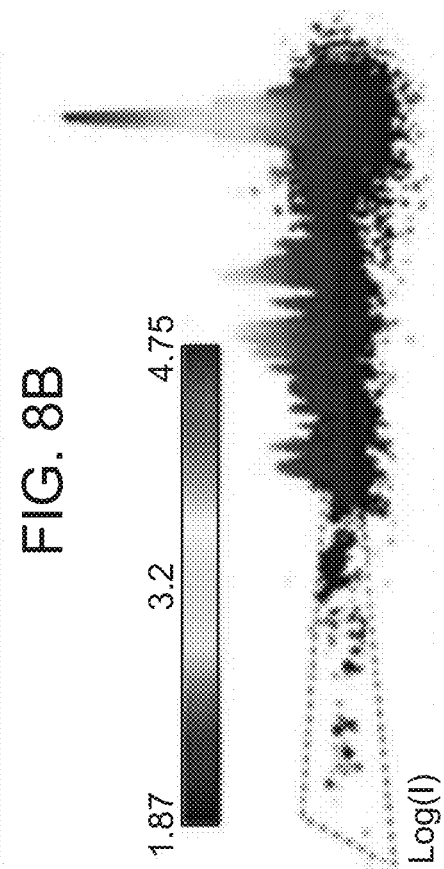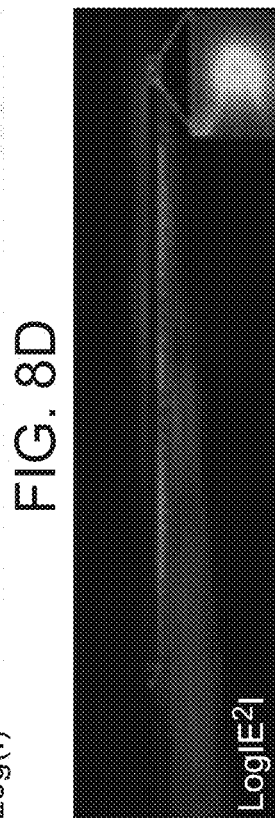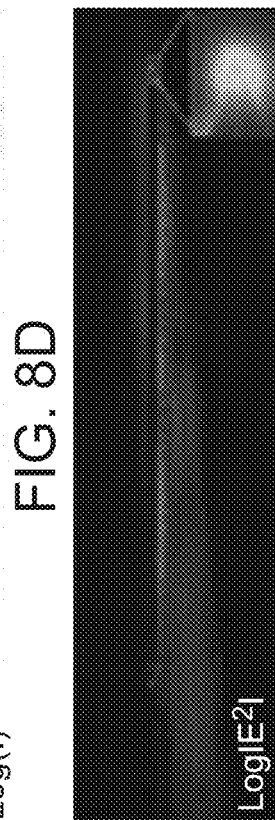
FIG. 8A  FIG. 8B  FIG. 8C  FIG. 8D  FIG. 8E  FIG. 8F

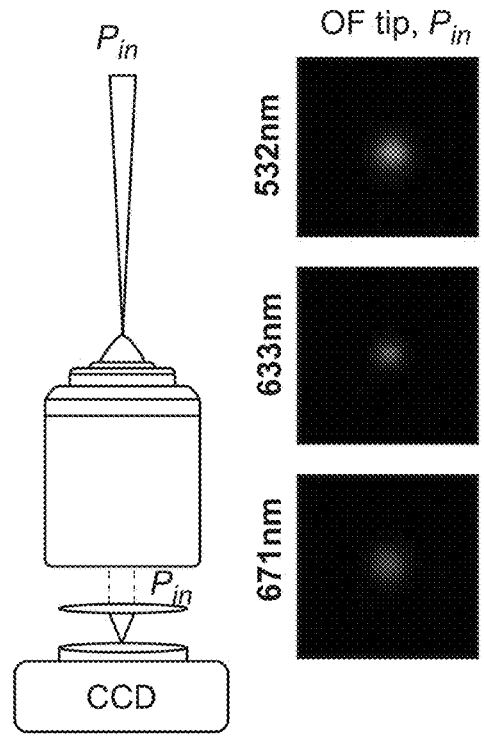 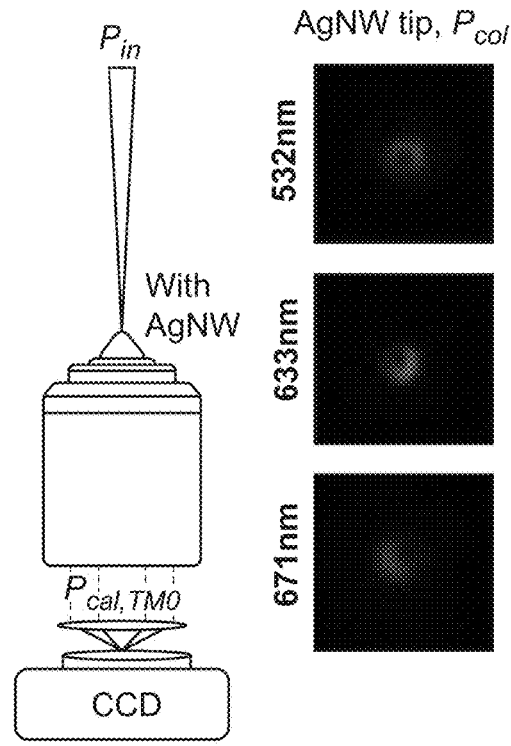
FIG. 11A  FIG. 11B
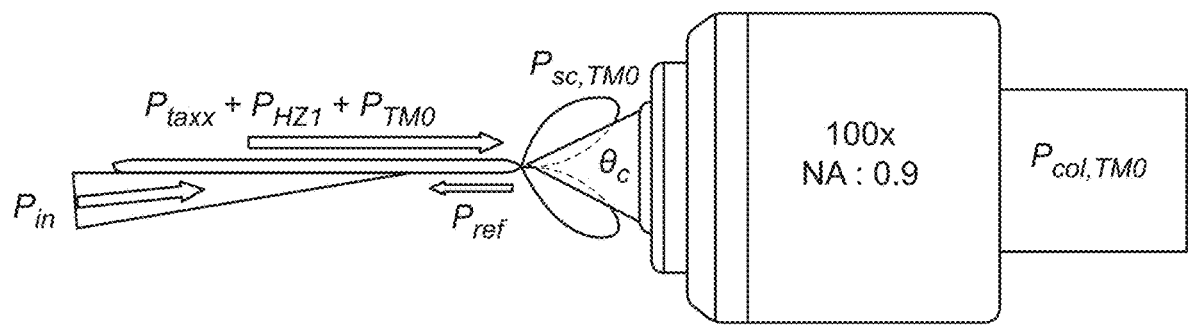
FIG. 11C

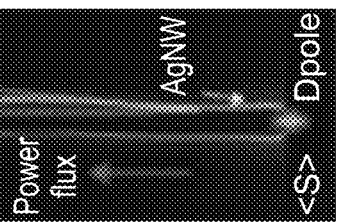
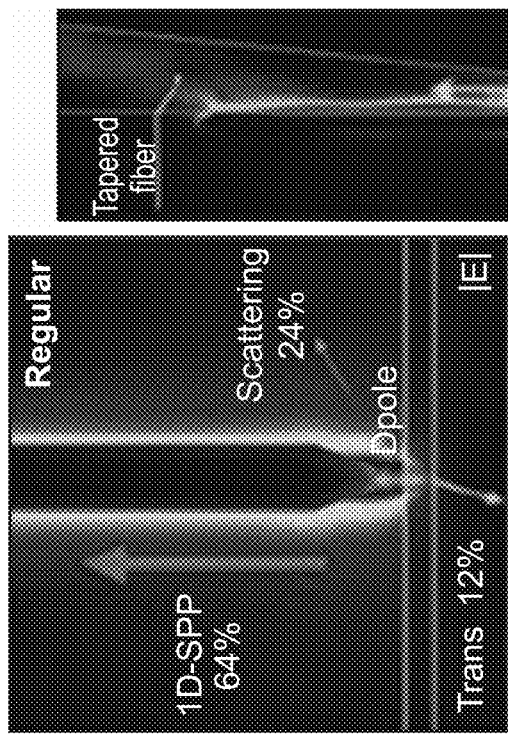
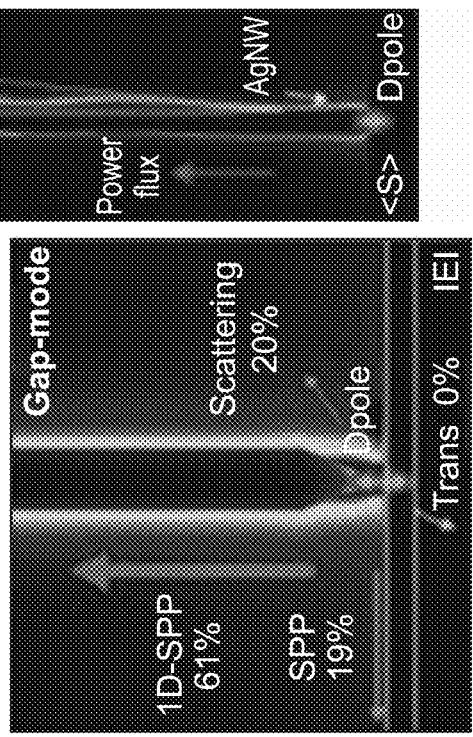
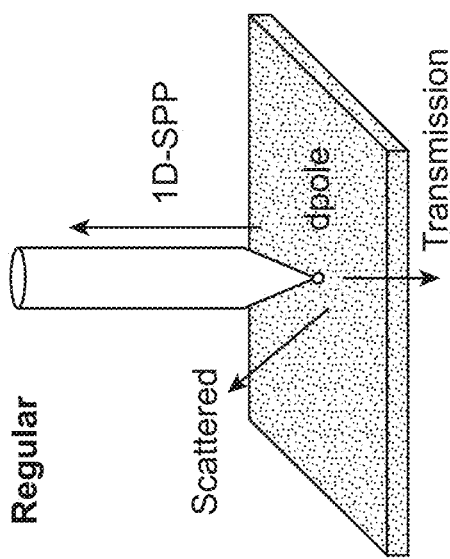
FIG. 14A
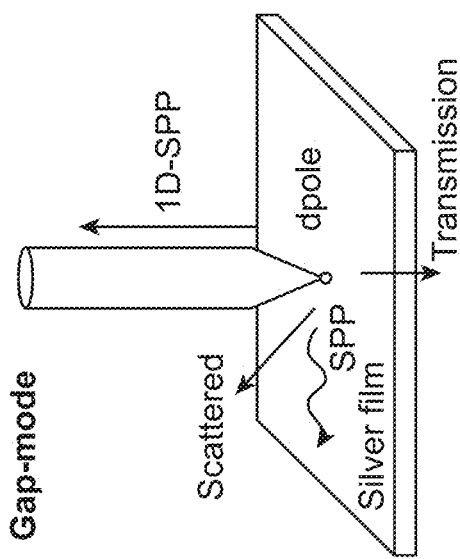
FIG. 14B
FIG. 14C

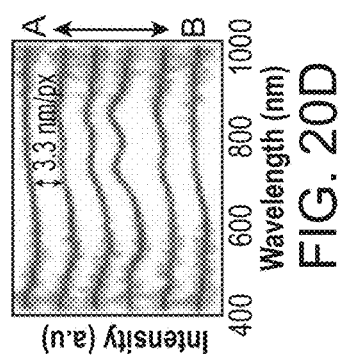
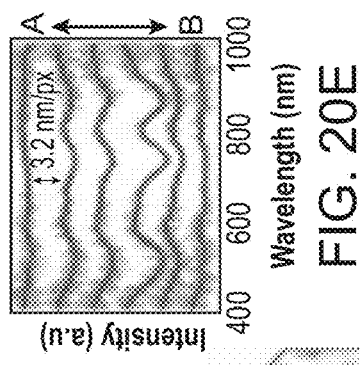
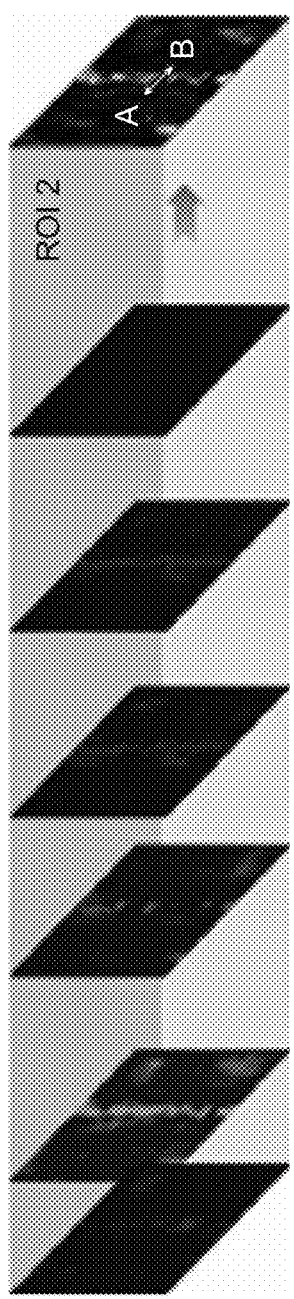
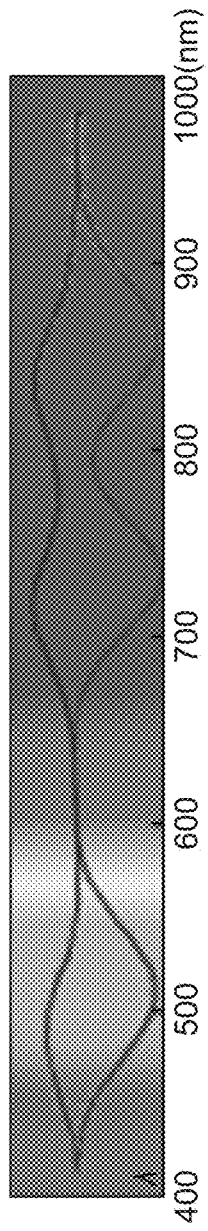
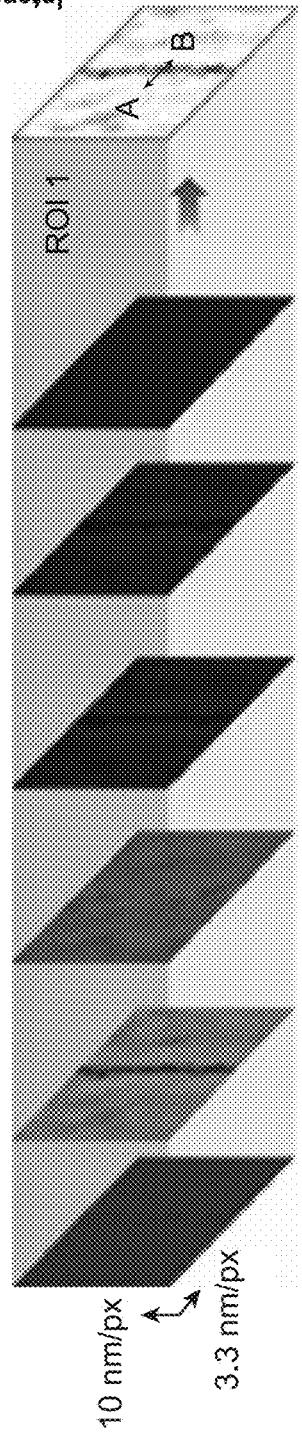
FIG. 20A
FIG. 20B
FIG. 20C
FIG. 20D
FIG. 20E

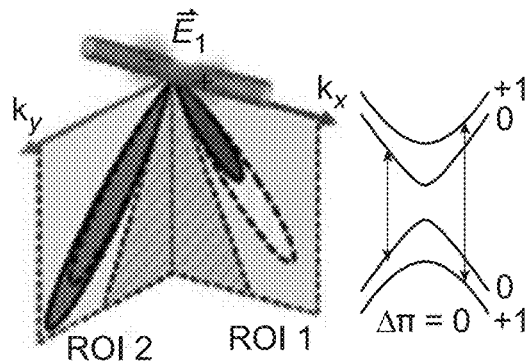
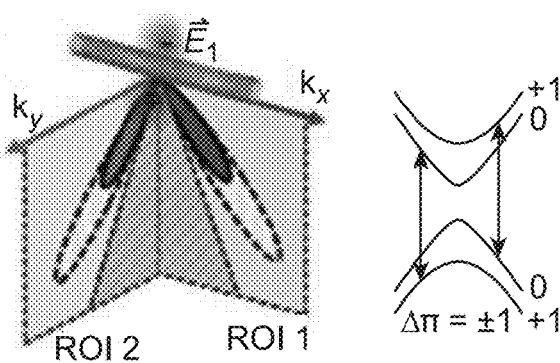
FIG. 21A  FIG. 21B
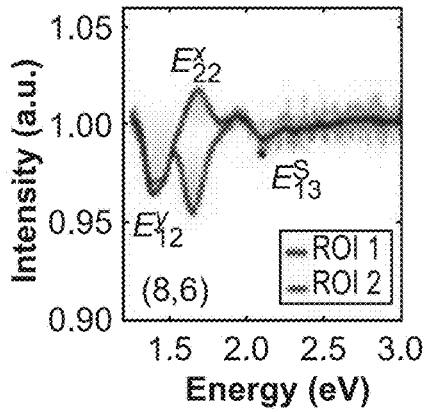
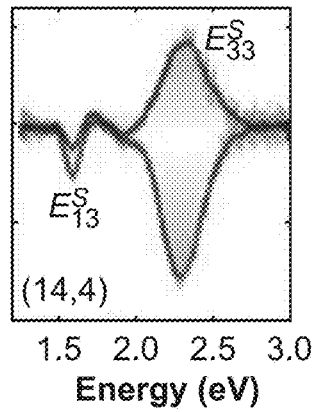
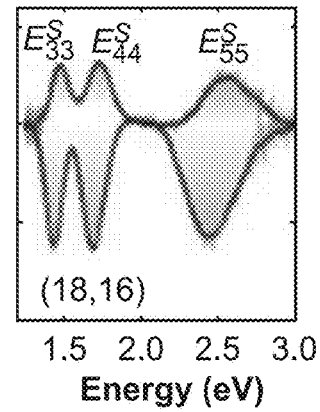
FIG. 21C  FIG. 21D  FIG. 21E
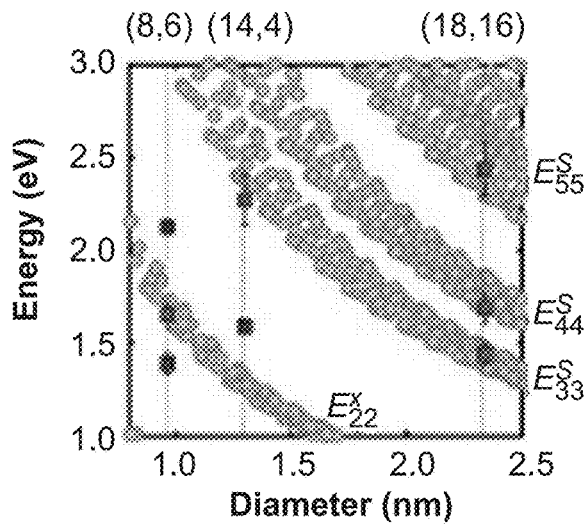
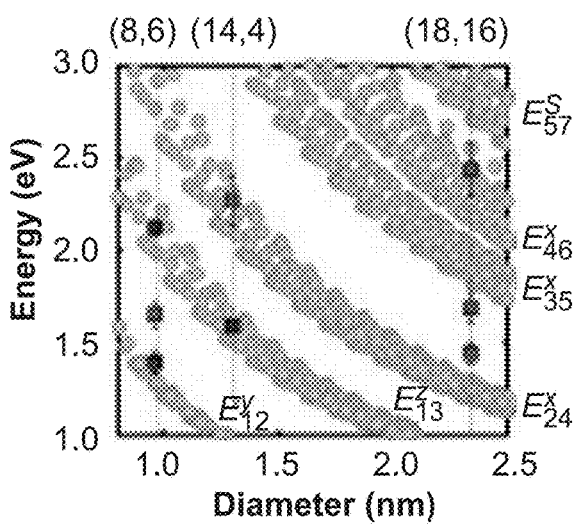
FIG. 21F  FIG. 21G

DEVICE INTEGRATED WITH SCANNING PROBE FOR OPTICAL NANOFOCUSING AND NEAR-FIELD OPTICAL IMAGING

CROSS REFERENCE TO RELATED APPLICATIONS

This application claims the benefit of U.S. Provisional Application 62/825,519, filed Mar. 28, 2019, which is incorporated by reference in its entirety.

STATEMENT OF GOVERNMENT INTERESTS

This invention was made government support under Contract Nos. 1654794 and 1654796 awarded by the National Science Foundation. The Government has certain rights in the invention.

FIELD

The present disclosure generally relates to Near-field optical microscopy including fiber-in-fiber-out high-efficiency nanofocusing technology for nanoscale light delivery and spectroscopy mapping.

BACKGROUND

Optical microscopy is a powerful characterization tool. However, its spatial resolution has been restricted to around 200 nm in the past century, limited by the diffraction limit of light.

Near-field scanning optical microscopy (NSOM) utilizes the evanescent wave in the vicinity of a scanning probe to break the diffraction limit. After the first demonstration in 1984 (by Betzig, 2014 Nobel Prize in chemistry), there have been several companies in this field to provide commercial solutions for nanoscale optical imaging, including Nanonics, Bruker, Neaspec, Horiba, etc.

The major problem in current NSOM designs is the low optical throughput (approximately $10^{-5}$ to $10^{-3}$) of probes in converting the incident light into the evanescent waves. The dim light source requires sophisticated optical microscopes and tricky operations for signal detection, which has limited the instrument to research labs.

SUMMARY OF THE INVENTION

One described embodiment is a new probe design, which improves the optical throughput by several orders, from the conventional $10^{-4}$ to the revolutionary 50%. It also broadens the working wavelength range to cover nearly all visible light (approximately 450 nm to 800 nm).

In accordance with another aspect, a probe is disclose that generates a high-intensity light source at the probe tip, which can be used to illuminate the sample for Raman spectroscopy imaging, photocurrent imaging, UV-VIS imaging, and the like. The high-throughput also allows the probe to collect the local optical spectrum with nanoscale spatial resolution. Since no bulk optics (for example, a conventional optical microscope) is needed for the imaging, the technique can be readily integrated with existing nano-characterization facilities to provide complementary information. For example, the probe can be integrated with electron microscopes (e.g., SEM, TEM, FIB) for in-situ optical measurement.

In accordance with an aspect, a method is disclosed for generating a high-intensity light source at a probe tip, the method comprising: exciting a $TM_0$ mode of a surface plasmon polariton (SPP) in a sharp-tip metal nanowire (AgNW) waveguide with a linearly-polarized mode ($LP_{01}$) in a tapered optical fiber (OF); and compressing the $TM_0$ mode through a chemically-sharpened taper to a tip apex of the sharp-tip silver nanowire (AgNW).

In accordance with an another aspect, a probe is disclosed comprising: a tapered optical fiber (OF) configured to excite a $TM_0$ mode of a surface plasmon polariton (SPP); a sharp-tip metal nanowire waveguide arranged on a sidewall of the tapered optical fiber; and wherein a taper to a tip apex of the sharp-tip nanowire is configured to compress the $TM_0$ mode.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 1A-1F illustrate a two-step sequential nanofocusing concept, wherein FIGS. 1A-1C are false color SEM images of a fabricated AgNW-OF probe, with a gold electrode (yellow) partially covering a tapered OF to electrically connect the AgNW for STM imaging. The OF tip region (blue) is uncovered for the selective and effective excitation of the $TM_0$ SPP on a sharp-tip silver nanowire (200 nm in diameter, approximately 5 nm in tip radius). Inset: zoom-in of the AgNW tip, FIG. 1D is the phase-matching zones for $TM_0$ and $HE_1$ modes are separated for the selective excitation of the former, FIG. 1F, left: the calculated effective mode index of the $LP_{01}$ mode (green) with different OF diameters, and the mode indices of the $TM_0$ mode (blue line) and $HE_1$ mode (red line) of a AgNW (200 nm in diameter), and right: the effective mode indices of $TM_0$ mode (blue) and $HE_1$ mode (red) with different diameters. At the tapered AgNW tip, the $TM_0$ mode is further compressed by the reduced diameter, and FIG. 1E, simulation of the nanofocusing at the AgNW tip (tip angle 37°), with $TM_0$ input from the left. The light wavelength is 532 nm for all calculations.

FIG. 2A and FIG. 2B are high-magnification optical microscope sectioning images taken under different excitation wavelengths (532 nm and 633 nm) through adjusting the focal plan of the imaging objective (100×, NA=0.9) from different locations along the AgNW-OF probe: (i) and (v), near the coupling zones; (ii) and (vi), at the OF tip; (iii) and (vii), at the AgNW tip; (iv) and (viii), defocus by 1 µm. The white and blue dashed circles indicate the locations of AgNW and OF, respectively, and FIG. 2C are polarization resolved images of FIGS. 2B(iii) and 2B(vii). Yellow dashed arrows illustrate the transmission axis of the polarization analyzer (PL) placed in front of the lens (L) and CCD.

FIGS. 3A and 3B illustrate the mode power evolution along the AgNW-OF coupler for the forward (OF to AgNW) and backward (AgNW to OF) coupling processes, respectively. ($\theta_{OF}=7°$, $\lambda=532$ nm, $d_{AgNW}=200$ nm.), FIG. 3C illustrate dependence of the forward coupling efficiencies of $TM_0$ (blue) and $HE_1$ (red) modes on wavelength, with $\theta_{OF}$ varying from 6° (solid curves) to 9° (dashed curves). Inset: Tip scattering images for 532, 633, and 671 nm excitation, and FIG. 3D illustrate dependence of the backward coupling efficiency from $TM_0$ mode to the OF on wavelength.

FIGS. 4A-4F illustrate k-space measurement for mode weight and it dependence on AgNW diameter, and wherein FIGS. 4A-4C illustrate k-space images (i) and polarization-resolved images (ii, transmission axis marked by yellow dashed arrows), for 532, 633, and 671 nm excitation wavelengths, respectively, and wherein the scattered light from the $TM_0$ mode forms radially-polarized rings (between two dashed circles), while the $HE_1$ and $LP_{01}$ form linear polarized dots at the center (within the small dashed circle), FIGS. 4D-4F, the power weight of $TM_0$ mode in the AgNW with different diameters calculated from the k-space images, in comparison with the theoretical results (solid curves) acquired from the improved mode coupling theory. The AgNWs used for FIGS. 4A-4C are marked with (green) dashed circles. ($\theta_{OF}$ is 6°.).

FIGS. 5A-5E are lens-free fiber-in-fiber out (FIFO) STM-based TERS, and wherein FIG. 5A is a schematic of a STM-based TERS configuration, modified from a portable STM sealed in a helium chamber, Inset: A false-color SEM image showing the zoom in of the AgNW-OF probe, FIG. 5B illustrates a Raman spectra of 4-ATP on Au obtained with the FIFO configuration at a different gap distance controlled by the tunneling current, (10 mV, 0.6 μW, 10 sec), FIG. 5C is a STM topographic image of SWCNTs on Au film, the top inset shows the cross-sectional profiles along the dashed line, FIG. 5D is a 2D-plot of Raman spectra obtained along the dashed line in FIG. 5C, FIG. 5E is an intensity of Raman peak at 526 $cm^{-1}$ along the dashed line in FIG. 5D, the tunneling current and bias used for FIGS. 5C-5E are 0.5 nA and 1V respectively, and the excitation wavelength of the laser is 532 nm (approximately μW, 1 sec).

FIGS. 6B and 6C, the evolution of mode power in the waveguides for 6° and 15° fiber tip angle, respectively. The 15° tip cannot excite $TM_0$ mode efficiently, since the two coupling regions are not separated far enough, and FIG. 6D, to evaluate the role of separation of coupling regions, the phase matching regions for $TM_0$ and $HE_1$ are set the same, by forcing $k_c$ equal to $k_b$ (then d=0), while remaining other parameters the same as used in FIG. 6B. The $HE_1$ mode dominates after the coupling process. In all simulations, the diameter of AgNW is 200 nm, and the excitation wavelength is 532 nm.

FIGS. 7A and 7D, the E-field distribution for the forward (OF to AgNW) and backward (AgNW to OF) coupling process, acquired by 3D FEA simulations. In FIG. 7D, $TM_0$ mode is launched on the right-end of the AgNW. FIGS. 7B and 7E, the vertical component of the Poynting vector illustrates the coupling regions, and FIGS. 7C and 7F, the mode evolution given by the improved coupled-mode theory. In all simulations, the diameter of AgNW is 200 nm, and the excitation wavelength is 532 nm.

FIGS. 8A-8F illustrate high-efficiency light coupling through the AgNW-OF coupler. FIG. 8A illustrates the dark-field optical microscopy image of the AgNW-OF coupler, FIG. 8B illustrates the majority of the incident light sent in through the tapered fiber is coupled out to the free space through the AgNW tip, FIGS. 8C and 8D are intensity profiles (in a base-10 logarithmic scale), and FIGS. 8E and 8F are numerical simulations confirm that the light scattered by the AgNW-OF junction is negligible. Excitation wavelength: 532 nm, NW diameter: 200 nm, OF taper angle: 6°.

FIGS. 9A-9F is a comparison of $TM_0$ and $HE_1$ mode in nanofocusing and far field radiation, wherein FIGS. 9A-9C illustrate $TM_0$ mode can form a nanoscale plasmonic hotspot at the probe apex, which generates a radially polarized ring pattern at far field. The linear polarized light along the NW placement direction in OF likely to excite the radially polarized ring pattern, FIGS. 9D and 9F illustrate $HE_1$ mode has a cut off at around 100 nm in diameter, where it starts to couple into the free-space propagating wave. The linearly polarized light perpendicular to the direction of the NW placement in the OF is likely excite HE mode and its far-field pattern is a linearly polarized Gaussian beam.

FIGS. 11A-11C illustrate AgNW-OF coupling efficiency ($N_c$) measurement, wherein FIG. 11A illustrates Laser spots at the tip of a bare tapered OF, FIG. 11B are images of the AgNW tip, with the same input power ($P_{in}$), the $TM_0$ mode weight can be determined from the k-space measurement, and FIG. 11C, $N_c$ can be determined after considering the tip radiation efficiency and system collection efficiency.

FIGS. 12A-12C illustrate nanofocusing efficiency of a AgNW tip, wherein FIG. 12A is a sketch of the nanofocusing model, the energy dissipation channels (including transmittance, scattering and reflection) are illustrated, FIG. 12B illustrates the coefficients dependence on tip angles, and FIG. 12C illustrates the wavelength-dependence of the coefficient.

FIGS. 13A and 13B illustrate overall coupling efficiency of Fiber-In and Fiber-Out (FIFO) configuration. The light coupling occurs in the route of conversion of the photon in a tapered OF1 to SPP in AgNW and the conversion of the SPP back to photon in the other OF2, wherein FIG. 13A illustrates measurement of direct light coupling (without AgNW) from a tapered OF to the other one 25 μm distant from each other, and FIG. 13B illustrates measurement of photon coming out of the OF2 end that has been converted from photon to SPP and SPP to photon at the two light coupling regions at the two OF tips, and the NW diameter and wavelength of the laser are approximately 200 nm and 532 nm respectively.

FIGS. 14A-14C is a schematic for understanding the radiation channels in a modified emission system, wherein FIG. 14A illustrates an electric dipole is placed between a dielectric substrate and a sharp-tip AgNW, with its polarization normal to the substrate. Full-wave simulation on the right shows the contribution of each radiative channel to the total radiative energy transfer ($r_r$), FIG. 14B illustrates the dipole is placed between the AgNW and a silver substrate, and FIG. 14C illustrates the Poynting flux image shows that the 1D-SPP on the AgNW is back-coupled to the OF, as suggested in FIGS. 1A-1E. Simulation parameters for all configurations: AgNW diameter is 200 nm, tip radius is 5 nm, the dipole oscillation frequency corresponds to 532 nm wavelength in free space, AgNW-to-substrate distance is 1 nm.

FIGS. 15A and 15B is a simulated displacement of OF with different taper angles, wherein FIG. 15A illustrates displacement distribution along the OF with 4 and 8 taper angles. The arrow represents the displace gradient, and FIG. 15B illustrates relative displacement as function of OF taper angle with a certain shear force applied along the OF.

FIGS. 19A-19C are scattering- and absorption-based dark-field nano-hyperspectral imaging of a strained SWNT, wherein FIG. 19A is a sketch of the set-up employing a silver nanowire (AgNW) nanofocusing scan probe with the incident light from a tungsten-halogen lamp for tip illumination. The major lobe of far-field radiation is blocked by a k-filter, and the side-lobes from the interaction between the superfocused tip dipole and its induced dipole in the sample is used for imaging, and FIG. 19B illustrates the radially polarized far-field radiations have the directional components (noted as $k_\parallel$ and $k_\perp$) associated with the corresponding regions in the image plane (noted as ROI 1 and 2), FIG. 19C illustrates the absorption (left panel) and scattering (right panel) true-color images of a strained SWNT, acquired from ROI 1 and 2, respectively.

FIGS. 20A-20E are hyperspectral maps of a SWNT sample, wherein FIGS. 20A and 20C, slices from the hyperspectral data show the scattering and absorption images of the (18, 16) SWNT at different excitation wavelengths. Right panel: True-color images of the SWNT, constructed by converting the hyperspectral images into the RGB (red, green and blue) channels using the CIE 1931 color matching functions, FIG. 20B illustrates representative spectrums of SW T, acquired by accumulating the spectra from the points along the SWNT, FIGS. 20D and 20E illustrates waterfall plots of near-field spectra taken across the SNWT, with a scanning step of 3.3 nm per pixel. The integration time is 0.3 second per spectrum. The total light intensity delivered by the optical fiber is approximately 30 nW.

FIGS. 21A-21G are optical absorption and scattering from parallel and perpendicular excitations, wherein FIG. 21A illustrates Left panel: the side-lobe far-field radiation from the parallel excitation. The shadow region indicates the blocking from the k-space filter. Right panel: The energy band near the Fermi level with band indices labelled for a chiral vector. The all owed transitions for parallel excitation require $\Delta n=0$, FIG. 21B illustrates the far-field radiation sketch (left panel) and the band structure (right panel) for perpendicular excitation, FIGS. 21C-21E illustrate the representative spectra from three different SWNTs, with chiral indices (8, 6), (14, 4) and (18, 16), respectively, FIG. 21F illustrates a Kataura plot showing the energies for parallel transitions ($\Delta n=0$) in different semiconductor-type SWNTs. The green squares indicate the measured transitions that have opposite features in the two spectra. The orange squares correspond to the transitions with similar features in both spectra, and FIG. 21G illustrates a Kataura plot for perpendicular excitation ($\Delta n=\pm 1$).

FIGS. 22A-22F are optical transitions in a strained SWNT, wherein FIG. 22A illustrates the AFM topographical image of a curved SWNT, created by AFM-based nanomanipulation on a straight SWNT. The dashed line is the eye-guide for strained (green) and unstrained (purple) regions along the nanotube, FIG. 22B illustrates the spectra along the nanotube taken from ROI 1, FIG. 22C illustrates the spectra taken from ROI 2, FIG. 22D illustrates the transition energy $\Delta E_{33}^S$ plotted against $\Delta E_{13}^S$, including both the unstrained (purple) and strained (green) regions. The variation ratios $\Delta E_{33}^S$ and $\Delta E_{33}^S$ are normalized against their averaged values in unstrained regions and show linear correlation with the slope close to 1, and FIGS. 22E and 22F illustrate comparison of the spectra averaged from 10 data points from the unstrained and strained region, recorded by ROI 1 and 2, respectively.

DETAILED DESCRIPTION

Figures 2A, 2B, 2C:
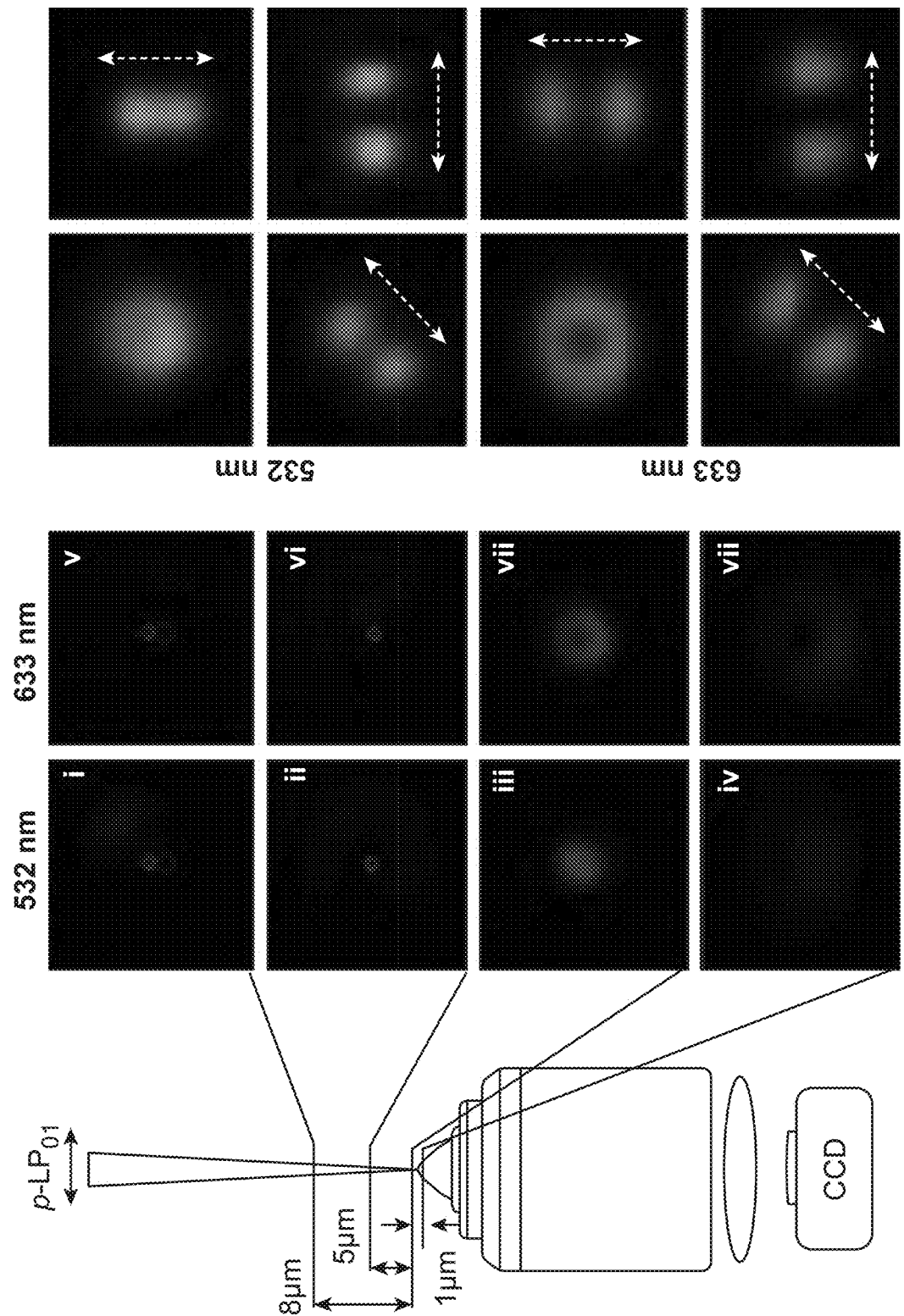
FIGS. 2A-2C is an experimental demonstration of the selective and effective $TM_0$ mode excitation and nanofocusing.

Reference will now be made in detail to the present preferred embodiments of the invention, examples of which are illustrated in the accompanying drawings. Wherever possible, the same reference numbers are used in the drawings and the description to refer to the same or like parts.

Conventional NSOM designs use two strategies to generate nanoscale light sources for imaging: (1) Scattering-NSOM, which utilizes the plasmonic resonant at the probe apex to provide enhanced electromagnetic fields for imaging. The major problems are the low plasmonic enhancement factors and the diffraction-limited excitation beam, which generates strong background noise and reduces the signal to-noise ratio. (2) Aperture-NSOM, which uses a metal-coated optical fiber as the probe. The light source is formed by drilling a nanoscale aperture on the metal film. It is mainly limited by the low throughput of the nanoscale hole.

In accordance with an exemplary embodiment, a probe design is disclosed that gives high optical throughput (approximately 50%) through the resonant coupling between an optical fiber waveguide and a plasmonic waveguide. The surface plasmon polariton carried by the plasmonic waveguide is further compressed by the tapered nanowire tip, which generates a strong light-source for near-field imaging.

As shown in FIG. 1A, the probe is formed by a tapered optical fiber and a sharp-tip metal nanowire (here silver nanowires are used). The incident light is coupled into the probe through the optical fiber. At a certain position (coupling zone 1), the photonic mode in the optical fiber matches with the plasmonic mode in the silver nanowire, resulting in high efficiency energy transfer from the fiber to the nanowire, in the form of subwavelength surface plasmon polariton (SPP). The SPPs propagate along the nanowire and get further compressed by the tapered nanowire tip, generating a strong nanometer-sized plasmonic hot-spot for optical characterization (FIG. 1E). The probe can be used in commercial scanning probe microscopes (SPM), such as atomic force microscope (AFM) and scanning tunneling microscope (STM).

The described embodiments improve the NSOM probe efficiency by several orders, from approximately $10^{-5}$ to $10^{-3}$ to 50%, resulting in the removal of conventional optical microscopes in a NSOM, as well as the possibilities to integrate with other characterization tools. For example, the high-power plasmonic hotspot can be potentially used to generate photoexcited carriers with nanometer resolution to provide direct insight into the physical processes governing the performances (e.g. operation speed, photoresponsivity) of nano-electronics; it can also be integrated with electron microscopies (e.g., SEM and FIB) to perform in-situ Raman/Photoluminescence/UV-VIS characterization. This technique bears a significant impact on a broad range of research areas and will be of interest to both scientific and industrial readers due to the far-reaching applications. Moreover, the probe preparation is repeatable and economic.

Efficient, broadband illumination and collection through a nanometer-sized hotspot carried by a scanning probe will endow the light-matter interaction research with nanoscale spatial information. However, near-field scanning optical microscopy (NSOM) probes, particularly the high-resolution ones, demand cumbersome optics but can only concentrate less than $10^{-3}$ of the incident light, which has limited its applications. In this disclosure, a two-step sequential broadband nanofocusing technique is disclosed with an unprecedented external nanofocusing efficiency of approximately 50% over nearly all visible range on a fiber-coupled nanowire scanning probe, which is capable of both light delivery and spectrum collection with nanoscale spatial resolution. Integrating with a basic portable scanning tunneling microscope (STM), in the present disclosure, the first lens-free tip-enhanced Raman spectroscopy and achieved 1 nm spatial resolution is demonstrated. The high-performance and vast versatility offered by this fiber-based nanofocusing technique allow for the easy incorporation of nano-optical microscopy into various existing measurement platforms.

The extension of nanophotonics into the quantum regime requires the injection and extraction of photons in/from nanoscale dimensions with high spatial/spectral precisions and low losses, which pushes the limits of our existing optical characterization tools not only in spatial resolution but also in bandwidth and efficiency. The demand for deciphering light-matter interactions at the nanoscale has incubated the invention and continued the development of NSOM, which defeats the diffraction limit by creating a nano-hotspot in the near-field. However, despite many demonstrations of novel NSOM probe designs, such as tip-integrated bow-tie antennas/apertures or concentric circle gratings at the tip, to improve the probe performance, the large mismatch in wavenumber k between the far-field propagating wave ($k \sim 10^5$ $cm^{-1}$ for visible wavelengths) and the highly confined localized-surface-plasmon mode (LSP, $k > 10^7$ $cm^{-1}$) at the near-field continues to pose a major challenge in the realization of broadband nanofocusing with high external efficiency. Moreover, increasingly sophisticated probe fabrication, intricate instrumental design, and sensitive optical alignment have also limited the practical relevance of NSOM, and its flexibility for integrating with other research platforms, such as ultra-high-vacuum cryogenic systems and electron microscopes, to cater to the need for correlated spectroscopic, structural and even functional imaging at competing spatial resolutions.

An appealing method to smooth out the huge momentum gap between the far- and near-field is termed "adiabatic nanofocusing", the essence of which is to excite surface plasmon polaritons (SPPs) in a tapered waveguide that allows SPPs to increase their wavenumbers gradually and smoothly as they propagate towards a nanosized tip to achieve efficient and broadband enhancement of the local field at the tip apex. This concept has been realized in tapered metal-insulator-metal (MIM) gap waveguides and conical metal waveguides. The former can compress linearly polarized incident light with high efficiency; however, its experimental resolution has been limited by fabrication restrictions. The latter, such as tapered metal tips and metal-coated fibers, utilizes a radially-polarized SPP mode ($TM_0$) excited through either a grating coupler or the end-fire method, which can be adiabatically compressed to the tip apex. However, its external nanofocusing efficiency, defined as the fraction of energy carried by the far-field incident photons that is effectively converted to the nanoscale LSP resonances, is currently limited to the lower single digit range. Practically, the most effective way to boost SPP excitation efficiency is the prism coupling method, which utilizes the resonant mode coupling at the phase-matching condition for efficient energy transfer. Unfortunately, although the incorporation of the phase-matching concept into the nanofocusing NSOM probe design has long been expected promising, the experimental results are rather low.

In accordance with an aspect, a two-step sequential nanofocusing technique is disclosed, which achieves high-efficiency, broadband, and dual-directional nanofocusing for near-field optical excitation and spectrum collection. The nanofocusing process consists of two consecutive steps: (1) A resonant-mode-coupling process to selectively excite the $TM_0$ mode in a sharp-tip silver nanowire (AgNW) waveguide with the linearly-polarized mode ($LP_{01}$) in a tapered optical fiber (OF), and (2) A quasi-adiabatic nanofocusing step to further compress the $TM_0$ mode through the chemically-sharpened taper to the tip apex of the AgNW. Both steps have been accomplished with approximately 70% efficiencies, which combines to yield a total external nanofocusing efficiency of up to approximately 50% for both light injection and signal extraction across a broad range of the visible spectrum. The high-efficiency light shuttling between the far- and near-field, combined with the flexibility of the fiber optics platform, has capacitated the easy integration of such AgNW-OF nanofocusing probe with commercial scanning probe microscopies. In accordance with an exemplary embodiment, a portable educational STM (NatioSTM by Nanosurf AG) was converted to a fiber-in-fiber-out (FIFO) lens-free STM-NSOM-TERS (tip-enhanced Raman spectroscopy) microscopy capable of 1 nm imaging resolution and 208 c.p.s. sensitivity on single-walled carbon nanotubes (SWCNT), and 1520 c.p.s. on a Rhodamine 6G (R6G) monolayer.

Selective Mode Excitation and Nanofocusing.

The foundation of high-efficiency nanofocusing is the selective and efficient excitation of the radially-polarized $TM_0$ mode, which is the only mode without cutoff and can be effectively focused on the apex of a tapered rod, rather than higher-order loosely-bound SPP modes on the AgNW, in particular, the $HE_1$ SPP mode. In accordance with an embodiment, the mode selectivity is accomplished by physically separating the coupling regions for different modes. FIGS. 1A-1C show scanning electron microscopy (SEM) images of a AgNW-OF probe. A sharp-tip AgNW (5 nm in tip radius, 200 nm in diameter) sits on the sidewall of a tapered optical fiber (tip angle around 6°), which is partially coated with a gold thin film of approximately 100 nm in thickness (false-colored in yellow) for electrical connection required by the STM feedback control. The OF tip region starting approximately 30 µm from the fiber apex is left clean for SPP excitation. As illustrated in FIGS. 1D and 1F, the incident light is launched into the fiber with linear polarization (p-$LP_{01}$ mode, with the major E-field along $\vec{x}$) and evolves adiabatically along the tapered fiber tip, resulting in the gradual decrease in effective mode index ($n_{OF}$, the green curve in FIG. 1f) and phase constant ($k_{OF} = n_{OF} \cdot k_0$, $k_0$ being the vacuum wavenumber). When $n_{OF}$ approaches the $TM_0$ mode index of the AgNW SPP (blue horizontal line in FIG. 1F) in Coupling Zone 1, the $LP_{01}$-$TM_0$ phase-matching condition is satisfied for resonant mode coupling between them. Consequently, most of the incident energy tunnels from the $LP_{01}$ fiber mode to the $TM_0$ SPP mode. Beyond Zone 1, the energy tunneling terminates due to the mismatch in k, and the energy injected from the fiber is locked in the $TM_0$ SPP mode. This coupling process is an optical analogy to the Landau-Zener tunneling effect, the efficiency of which is determined by the coupling strength and the variation rate of k along z, and can be as high as the Kretschmann-Raether configuration. In a properly designed probe, only a small portion of the incident energy remains in the $LP_{01}$ fiber mode at this point, which propagates further to meet the resonant mode coupling conditions of the $HE_1$ mode in Coupling Zone 2. The existence of residue energy in either the $HE_1$ SPP mode or $LP_{01}$ fiber mode is highly undesirable, because neither can be effectively nanofocused at the AgNW tip due to mode cut-offs, and will both contribute to unwanted wide-field background illumination around the tip. Therefore, the efficiency of the energy tunneling in Zone 1 is essential in achieving effective nanofocusing with not only high-efficiency but also low background noises. The second step of the nanofocusing process is illustrated in FIG. 1E. The $TM_0$ SPP mode, carrying the majority of the incident energy, is further compressed by the conical taper at the AgNW tip to a nanoscale LSP hotspot at the tip apex (FIG. 1E). This is a classic quasi-adiabatic nanofocusing process, which affords a compression efficiency of up to 70% for visible wavelengths (FIG. 17), for the tip angle of the sharp-tip AgNW around 40° (inset, FIG. 1C).

Figure 9C:
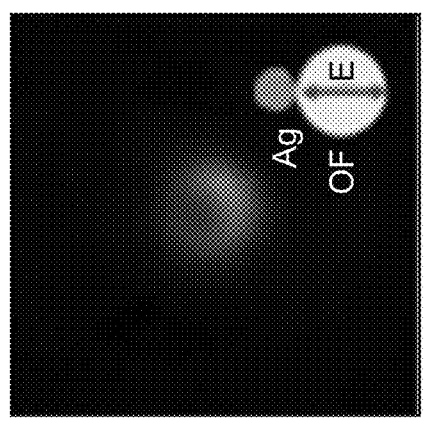
Figure 9F:
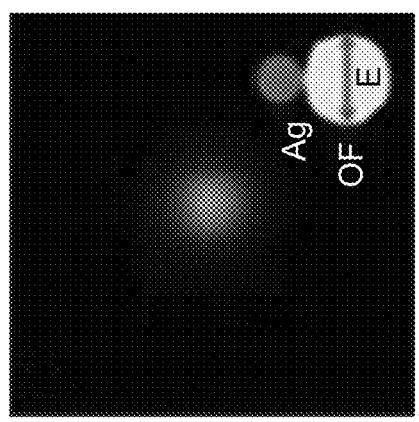

In accordance with an aspect, to experimentally verify the efficient and selective excitation of the $TM_0$ SPP mode in the AgNW, vertical sectioning was performed by shifting the focal plane of a high-numerical-aperture (NA=0.9) objective lens along the probe axis from the AgNW-OF junction to the AgNW tip. FIG. 2A portrays the measurement setup with the positions of the vertical sectioning marked and corresponding images under different excitation wavelengths shown in FIG. 2B. For both 532 and 633 nm excitations, the scattered light from AgNW-OF junction was close to zero (FIG. 2B i-ii and v-vi), confirming the high coupling efficiency of the SPP launching process. This observation echoes with the side-view image of the junction (FIGS. 8A-8E), which also shows negligible scattering loss during the process. The conclusive evidence of the selective $TM_0$ excitation is shown in FIG. 2B iii and vii, where the AgNW tip apex appears as a single doughnut-shaped bright spot. As shown in the numerical simulations (FIGS. 9A-9F), this doughnut pattern is a signature of $TM_0$ SPP mode and originates from the radially polarized far-field scattering of the tightly focused longitudinal dipole oscillating at the tip apex. The polarization-resolved images in FIG. 2C confirm that the radiated light from the AgNW tip is indeed radially polarized. In the case that the $HE_1$ mode dominates the OF-to-AgNW tunneling process, which, for example, can be realized by changing the polarization of the fiber mode to the s-polarization (s-$LP_{01}$) that selectively excites the HE SPP mode, a Gaussian-shaped spot was observed (FIG. 9F).

Figure 4A:
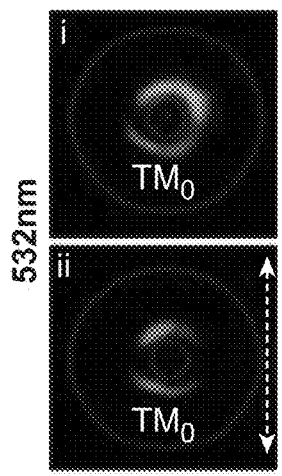
Figure 4B:
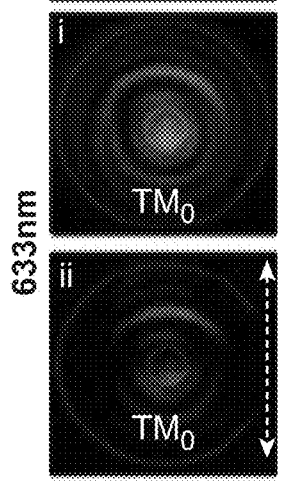
Figure 4C:
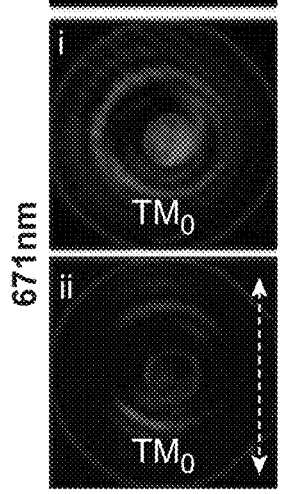
Figure 4D:
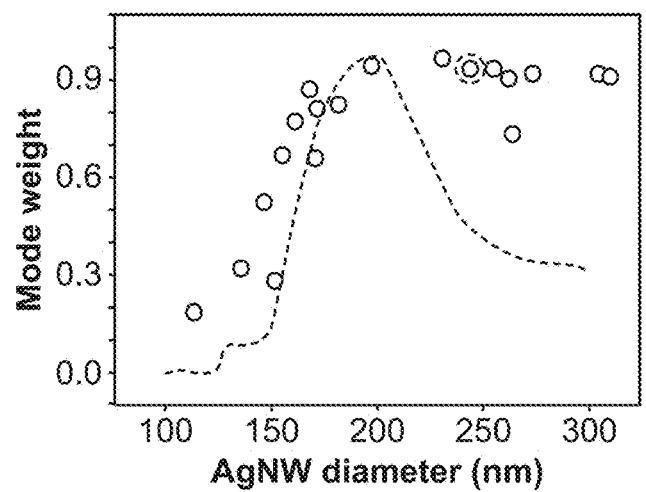
Figure 4E:
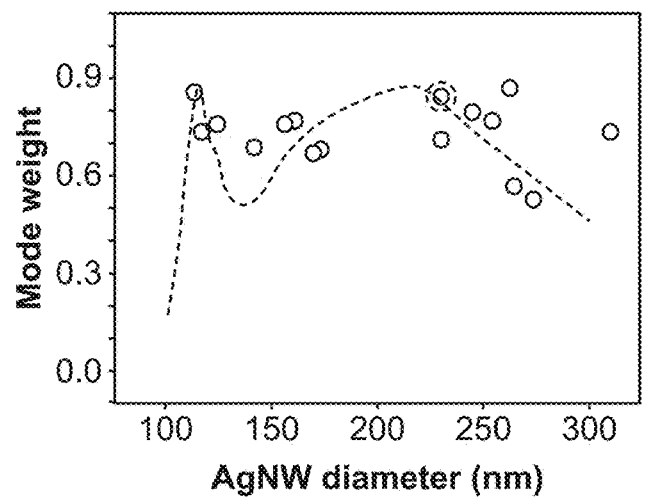
Figure 4F:
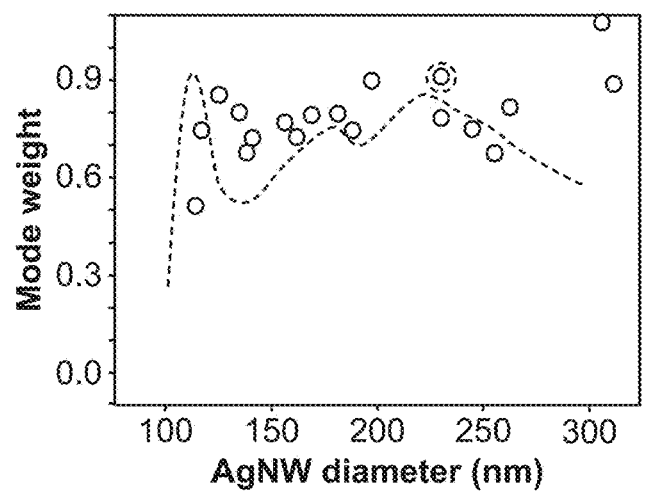

The nanofocused $TM_0$ SPP mode at the AgNW tip apex was confirmed with spatially Fourier transformed (k-space) imaging. As shown schematically in FIG. 2D, the AgNW tip was used to excite a leaky SPP mode at the air-gold interface of a gold-coated glass substrate, which allows the resolution of the SPP modes at the tip apex through spatially Fourier transformation. The distance between the AgNW-OF probe and the gold film (40 nm in thickness) is kept at around 50 nm to maximize the excitation efficiency. FIG. 4D shows the k-space images of the gold surface, acquired through projecting the objective's back-focal plane onto a CCD camera. The radially-polarized ring outside of the white dashed circle are the leaky SPP mode excited by the nanofocused $TM_0$ mode. The partially radially-polarized light between the orange and white dashed circles are also contributed by the nanofocused $TM_0$ mode, but by the portion that instead of exciting the leaky SPP modes along the gold surface, direct scattered into and propagated through the gold film. The weak linearly-polarized beam inside the orange dashed circle is formed by the light scattered from the $HE_1$ mode at AgNW tip apex and from the $LP_{01}$ mode residue at OF tip apex, passing through the gold-coated glass slide and collected by the CCD. The k-space imaging shows unambiguously that the $TM_0$ mode is dominant at both the 532 nm and 633 nm excitations, demonstrating the efficient $TM_0$ mode nanofocusing by the AgNW tip.

FIFO-NSOM STM-TERS.

Figure 5A:
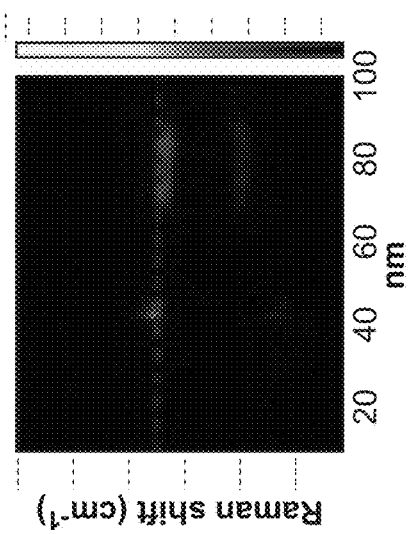

The high-efficiency, mode-selective, broad bandwidth, and dual-directional nanofocusing, combined with the flexible and lens-free nature of the fiber optic platform, enables the easy incorporation of near-field nanoscopy into existing high-resolution research platforms. TERS, for example, is a powerful tool to deliver chemical information at molecular length scales. However, after nearly two decades of development, it is still considered an esoteric technique by many, due to the complex instrumentation, difficult optical alignment and probe fabrication to achieve high resolution and sensitivity. With the fiber-based nanofocusing probe, in the present disclosure, it is shown that a basic educational STM can be converted to a high-performance portable TERS without resorting to cumbersome optical systems and delicate alignment procedures (FIG. 5A). This is the first demonstration of lens-free TERS and a major step towards making it a practical tool for routine nano-chemical imaging. The STM module was sealed in a set of glass chambers filled with helium gas, which protected the AgNW from being oxidized and reduced the environmental sound noise level through acoustic impedance mismatch. Both the excitation laser (532 nm solid-state laser) and Raman signals (550~590 nm) were conveyed in and out of the chamber via the same piece of single-mode optical fiber (Model SM600, Thorlabs, approximately 20 cm in length). The fiber has a tapered tip fabricated by a programmable fiber etching system through a two-step meniscus etching process as discussed herein, which creates a thick, stable base to maximize the mechanical stability of the probe and a sharp tip with optimized taper angle $\theta_{OF}$ for high-efficiency $TM_0$ coupling (FIG. 1A). As mentioned earlier, the optical fiber is partially coated with a 100 nm-thick gold film to electrically connect the AgNW for tunneling-current feedback control, which maintains roughly a 1 nm tip-to-substrate distance during scanning. Consequently, a plasmonic gap cavity is maintained between the tip apex and the metal substrate, which creates a nanometer-sized hotspot for high-resolution TERS excitation. The gap hotspot can also strongly increase the radiative decay rate for the emitters at its vicinity. Moreover, FEM simulation revealed that the short-range energy transfer to the gap SPP mode dominated the radiation process for a Raman emitter in the gap. Therefore, instead of scattered into the free space, the majority of the Raman signals is coupled back into the $TM_0$ SPP mode in the AgNW and collected by the optical fiber through the high-efficiency broadband back-coupling process. The Raman spectra were separated from the incident laser by a fiber-bench beam splitter, filtered by a long-pass edge filter, and then fed to a high-sensitivity thermoelectric-cooled CCD detector. The integration of FIFO nanofocusing TERS module to the STM requires minimal modification to the commercial scanning probe microscopy system or optical alignments. Owing to the low-loss nanofocusing and signal collection, high-quality Raman spectra can be collected on a self-assembled monolayers (SAMs) of molecular Raman dyes sample (FIG. 5C), a reference sample commonly used for TERS sensitivity evaluation. With an incident power of merely 1 µW, the Raman signal intensity around 1520 counts per second (c.p.s.) was achieved. The exclusion of high-power laser and intricate optical focusing systems not only significantly simplifies the equipment and operation for high-quality TERS measurement, but also make the incorporation of high-resolution chemical mapping capability into vacuum-chamber-based platforms practical.

Figure 5B:
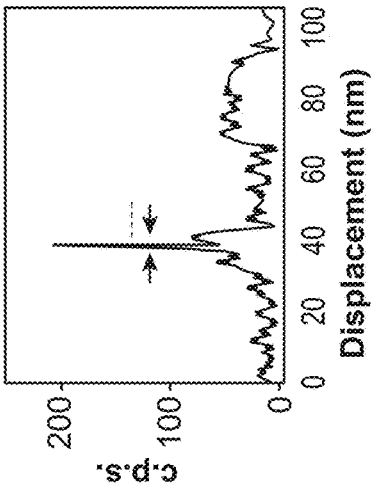
Figure 5C:
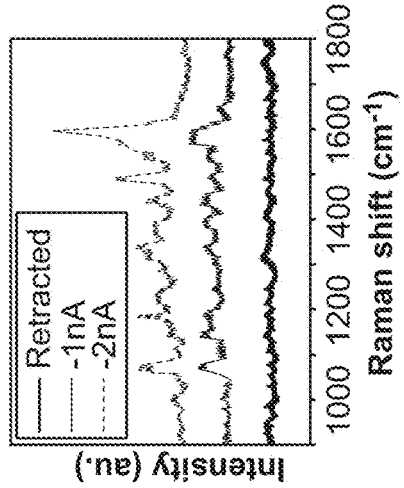
Figure 5D:
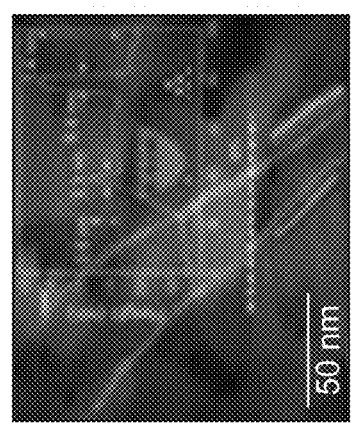
Figure 5E:
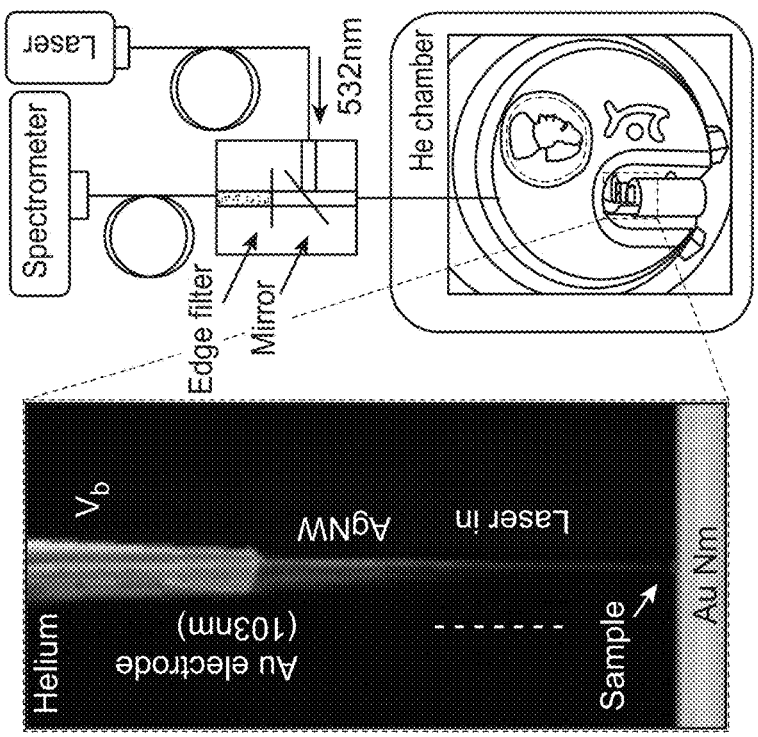

The spatial resolution of the FIFO nanofocusing probe for both STM and TERS mapping was examined with single-walled carbon nanotubes (SWCNT) deposited on Au. FIG. 5C shows the STM topographic mapping of the sample, which clearly shows two SWCNT bundles. The height profile extracted along the white dashed line in the top right insets show the left bundle has a height of 0.6 nm and a full-width-half-maximum (FWHM) of 3.3 nm, while the right one has a height of 1.4 nm and an FWHM of 6.4 nm. Taking into account of the 0.8 nm average diameter of the SWCNT sample, the left bundle at the dashed line is composed of a single SWCNT of 0.6 nm in diameter, from which and the FWHM we estimate the tip radius of the probe to be approximately 4.4 nm, which is in good agreement with the SEM measurement (FIG. 1C). The right bundle consists multiple SWCNTs and the cartoon in FIG. 5C shows a possible configuration of 6 SWCNTs with hexagonal close-packed stacking, based on the height and FWHM. Along the same dashed line, a TERS line scan was performed and the Raman spectra at different positions were plotted in a 2D image in FIG. 5B. The spectra exhibit two clear bands at approximately 1540 cm$^{-1}$ and 1600$^{-1}$ to 1630 cm$^{-1}$ at positions correspond well with the STM line scan (FIG. 5D). The former peak is assigned to G$^-$ band, consistent with the confocal Raman spectrum. The latter is assigned to the G$^+$ band, which is considerably red-shifted, more so in the single SWCNT on the left than the bundle on the right, compared to the confocal Raman spectrum (1580 cm$^{-1}$ to 1590 cm$^{-1}$), which may be a result of the torsional strain exerted by the probe tip, the dynamic temperature variation and the nanoscale cavity effect. FIG. 5E plotted the intensity (in c.p.s.) of the G$^-$ peak as a function of the position, and an FWHM of 1 nm was achieved on the single SWCNT, which marks the spatial resolution of the FIFO nanofocusing probe for TERS chemical mapping. In addition, for the same single SWCNT, a peak height of 208 c.p.s. was also demonstrated. It also worth noting that 70% of the SWCNTs in the commercial SWCNT used were semiconducting, which compelled a bias higher than their approximately 0.6V band gap to be chosen and that potentially limited the TERS signal attainable.

Coupled-Mode Evolution.

To further understand the selective TM$_0$ mode excitation and dual-directional broad-bandwidth coupling, the improved coupled-mode theory is implemented to investigate the evolution of different modes in the AgNW and the OF along their junction, through the following general expression:

$$dA_i/dz = ik_i A_i + \Sigma_{i,j} iK_{ij} A_j$$

where i,j represent the three participating modes (LP$_{01}$, TM$_0$, and HE$_1$), $A_i$ are the normalized electromagnetic fields, and k$_i$ are the phase constants. K$_{ij}$(i=j) represent the modification to k$_i$ from the neighbor waveguide, and K$_{ij}$(i*j) are the modified coupling coefficients from mode j to mode i. The polarization of the LP$_{01}$ mode was set along x-direction (p-polarization) to have a non-zero coupling coefficient with the TM$_0$ mode. The orthogonal polarization (s-LP$_{01}$) plays no role here because the selection rule forbids the coupling of the s-LP$_{01}$ mode with TM$_0$ of the AgNW and it will only excite the undesirable HE$_1$ mode. FIG. 5A shows the mode intensity evolution along the coupled waveguides during the nanofocusing process, with excitation in LP$_{01}$ fiber mode (532 nm) sent from the left. The energy tunneling from the OF to the AgNW starts at around 6 μm from the fiber tip, marked by a rapid drop in the LP$_{01}$ mode intensity. Since the LP$_{01}$-TM$_0$ phase-matching condition is satisfied firstly, the TM$_0$ mode picks up the majority of the input power. As a result, little energy is left in the LP$_{01}$ mode when the phase-matching condition for HE$_1$ coupling is finally established. Within 4 μm of coupling, above 99% of the incident energy is channeled into the AgNW, with approximately 70% remaining in TM$_0$ mode at the OF tip (z=0) when plasmonic loss is included.

Figure 3A:
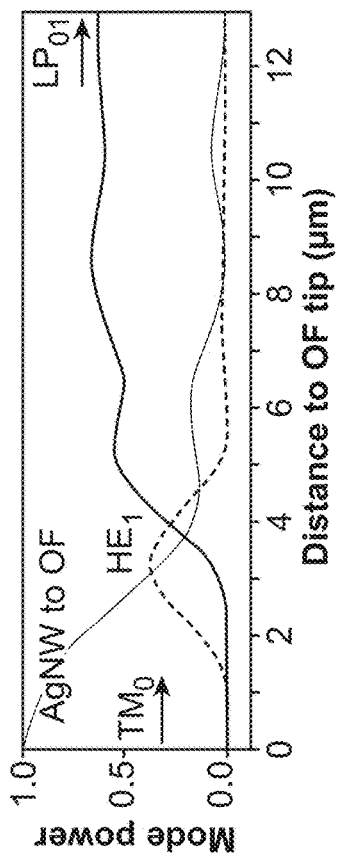
FIGS. 3A-3D illustrate mode evolution in the separate-region resonant mode coupling process.
Figure 3B:
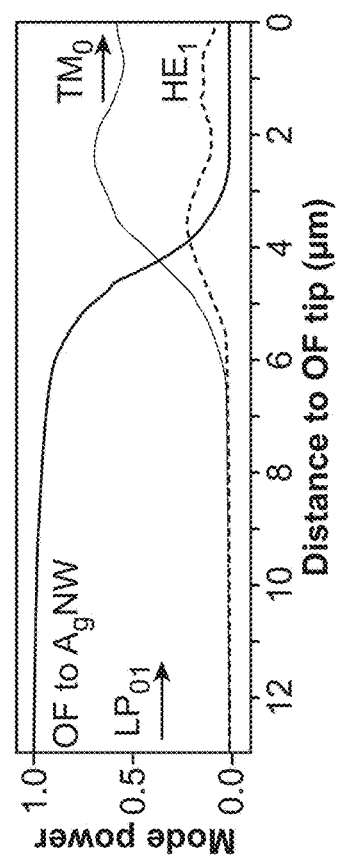

The effective signal extraction from a nanoconfined region, a reverse process of nanofocusing, also relies on the resonant mode coupling. FIG. 3B shows the mode evolution in the back-coupling process, as the onset of the energy tunneling from the TM$_0$ mode in the AgNW. In this reverse process, the TM$_0$ mode is first coupled to the HE$_1$ mode, through a process similar to the stimulated Raman adiabatic passage (STIRAP) in coupled waveguides, where two waveguide modes (TM$_0$ and HE$_1$) utilizes a third mode in a different waveguide (e.g., the leaky LP$_{01}$ fiber mode) as a bridge to exchange mode power. The optical power temporarily stored in the HE$_1$ mode is later coupled back into the LP$_{01}$ mode in their phase-matching zone. The mode-power changing rate derived from the mode-coupling theory is in good agreement with the Poynting flux extracted from the numerical simulation.

Figure 3C:
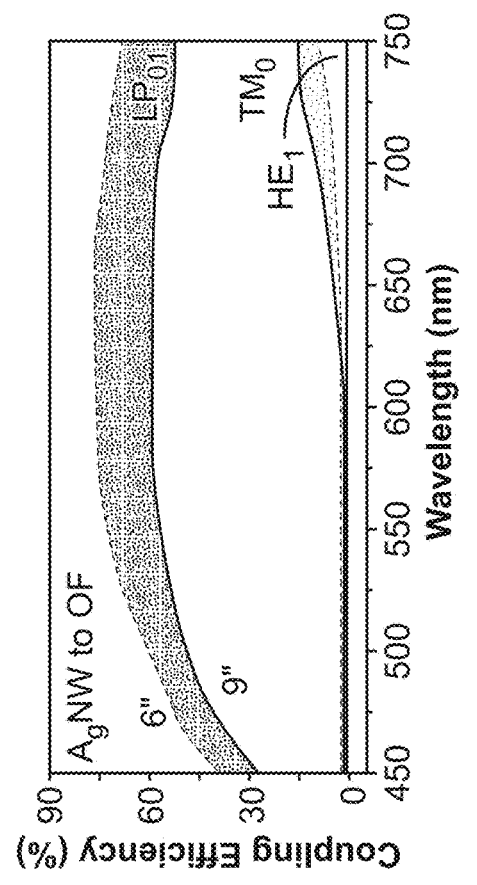
Figure 3D:
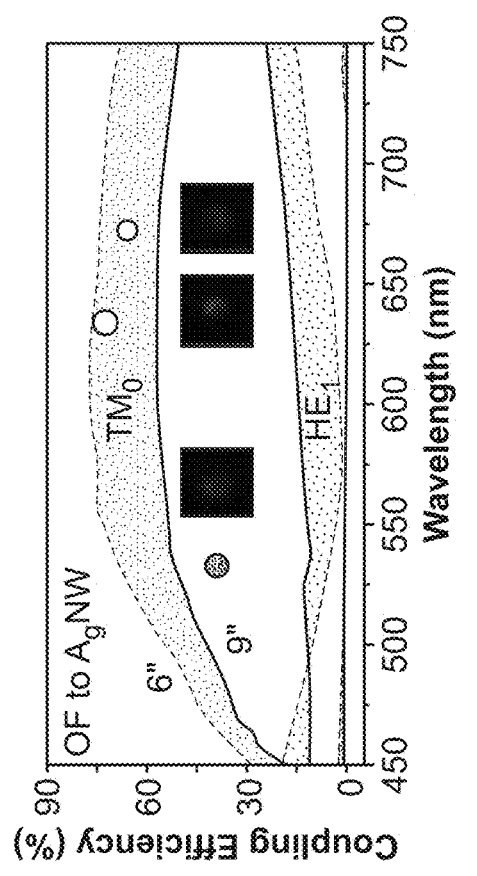

The AgNW-OF coupler has a broad working bandwidth covering the majority of the visible spectrum, owing to the forgiving phase-matching conditions established by the gradual taper of the coupling region. FIGS. 3C and 3D present the calculated forward and backward coupling efficiencies in the visible wavelength range for the OF taper angle ($\theta_{OF}$) of 6°-9°. The optimization of $\theta_{OF}$ is essential in achieving high-efficiency, dual-directional, mode-selective and broadband LP$_{01}$-TM$_0$ coupling, because it determines the distance and degree of overlapping between two coupling zones. A large $\theta_{OF}$ reduces the inter-zone distance and leads to the early onset of the LP$_{01}$-HE$_1$ coupling process, which interrupts the TM$_0$ mode excitation process and reduces its weight in total optical power. A small $\theta_{OF}$, on the other hand, results in a long propagation distance for the TM$_0$ mode before it reaches the OF tip and thus a high propagation loss. Our calculation indicates that within the optimized $\theta_{OF}$ around 7° to 12°, both the forward and backward coupling of TM$_0$ mode can be achieved with 60% to 70% external coupling efficiency in the entire green and red wavelength range.

In accordance with an exemplary embodiment, the Fourier transform k-space imaging measurement of the AgNW tip was performed to experimentally quantify the weight of TM$_0$ mode and determine the external coupling efficiency, which confirm that the AgNWs with diameter around 200 nm have the highest TM$_0$ mode selectivity (FIGS. 8A-8F). The efficiency for TM$_0$ mode can be calculated from the experimental mode weight, leading to 40%, 72% and 66% for 532, 633 and 671 nm excitation, respectively, which are plotted in FIG. 8C and in good agreement with the mode-coupling theory.

In summary, a two-step sequential optical nanofocusing method is disclosed for fiber-based near-field optical nanoscopy. In accordance with an embodiment, it is experimentally shown that one in every two incident photons can be effectively focused onto a nano-hotspot at the apex of a nanowire probe. This technique combines the advantages of both scattering- and aperture-NSOM, by providing strong signal enhancement and clean optical background without resorting to cumbersome optical focusing systems. In addition, its broadband and dual-directional nature also allows for near field spectrum collection at nanometer length scale. The high-performance and flexibility of the system can convert a basic educational STM to the first lens-free TERS with 1 nm resolution and up to 1520 cps signal strength at ≤1 µW of incident power, which represent a major step of bringing TERS, a powerful but esoteric molecular imaging tool to its full potential. By offering an easy solution for efficiency light injection and/or extraction at nanometer length scale, the fiber-based near-field nanoscopy holds great potentials as a plug-in module to existing high-resolution measurement platforms to provide complementary and spatially correlated information on molecular compositions (e.g. TERS), material properties (e.g. inter and intraband transitions) and optoelectronic device performance (e.g. photocurrent mapping).

Rigorous Analysis of the AgNW-OF Mode Coupling Process

Improved Coupled-Mode Theory

In the AgNW-OF hybrid waveguide system, the surface plasmon polariton (SPP) modes in the AgNW waveguide are strongly coupled with the fiber mode in the tapered OF since two waveguides are closely packed. Therefore, the widely used coupled-mode theory that considers only the weak coupling between two separated waveguides is insufficient in accuracy. Following the rigorous derivation in the Appendix H in Chuang S L. *Physics of Optoelectronic Devices*, Wiley, 1995, codes were developed based on the improved coupled-mode theory that considers not only the mode-coupling coefficient between two waveguides, but also the butt coupling coefficient and the change in propagation constant. Now the general evolution of the three modes (two SPP modes—$TM_0$, $HE_1$, and one OF mode—$LP_{01}$ is determined by the following generalized coupled-mode equations:

$$\frac{d}{dz}\begin{pmatrix} a(z) \\ b(z) \\ c(z) \end{pmatrix} = i \begin{pmatrix} k_a + K_{aa} & K_{ab} & K_{ac} \\ K_{ba} & k_b + K_{bb} & 0 \\ K_{ca} & 0 & k_c + K_{cc} \end{pmatrix} \begin{pmatrix} a(z) \\ b(z) \\ c(z) \end{pmatrix} \quad S(1)$$

Here, $a(z)$, $b(z)$ and $c(z)$ are the normalized amplitudes of the electromagnetic field of mode $LP_{01}$, $TM_0$ and $HE_1$, respectively, $k_i$ (i=a, b, c) is the modified propagation constant, $K_{ij}$ is the modified coupling coefficient from mode j to mode i, and $K_{ii}$ is the modification to $k_i$ due to the existence of the neighbor waveguide. Their detailed expressions can be found in Appendix H in Chuang S L. *Physics of Optoelectronic Devices*, Wiley, 1995. It is worth noting that since the $TM_0$ mode is orthogonal to the $HE_1$ mode, the coupling coefficient $K_{bc}=K_{cb}=0$ throughout the simulation.

Because the diameter of the tapered OF changes at different z, $k_i$, $K_{ii}$, and $K_{ij}$ are also functions of z. Their values are calculated from the overlapping integrals of the corresponding electromagnetic field distributions, which are obtained from the mode analysis performed by the finite element method (COMSOL Multiphysics). To prepare $k_i$, $K_{ii}$, and $K_{ij}$ for equation S(1), the fundamental $LP_{01}$ mode in an OF with a diameter ranging from 10 nm to 900 nm is calculated, at a dynamic step size between 5 nm to 30 nm. For the diameter smaller than the cut-off diameter, the mode with the highest mode refractive index is adapted.

The differential equations in equation S(1) are calculated using an ordinary differential equation (ODE) solver (Matlab Mathworks, ode45). To simulate the forward coupling process (from fiber to AgNW), the initial condition $(1, 0, 0)^T$ was used to represent the population in the OF in eq. S(1). The origin point of z (z=0) in the ODE solver is set at $r_{SiO2}$=900 nm, and the end boundary is set at $r_{SiO2}$=0 nm. To simulate the backward coupling process (from the AgNW $TM_0$ mode to the OF), the initial condition is $(0, 1, 0)^T$, and the origin point of z is set at $r_{SiO2}$=0 nm, with the ending point set at $r_{SiO2}$=900 nm.

Figure 6A:
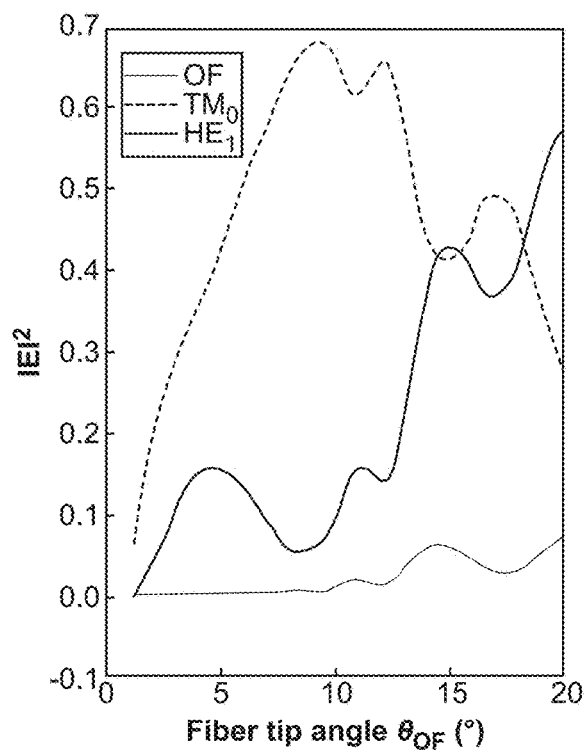
FIGS. 6A-6D illustrate the role of separation of coupling regions in the selective excitation of the $TM_0$ mode, FIG. 6A, Mode powers at the fiber tip. The optimized angle for $TM_0$-mode excitation is approximately 7° to 12°.

Role of the Separation of Coupling Regions in the Selective Excitation and its Angle Dependence The selective excitation of the $TM_0$ mode rather than the $HE_1$ mode is realized by separating their coupling regions. Because the $TM_0$ mode always have a higher effective mode index ($n_{eff}=k_b/k_0$, $k_0$ is the propagation constant in vacuum) than other SPP modes, the incident light in the tapered OF runs into the phase-matching region for the $TM_0$ mode first, where $k_a=k_b$ (let the corresponding fiber radius be $r_{TM0}$). The uncoupled light remaining in the OF propagates to the phase-matching region for $HE_1$ mode, where its phase constant matches with $k_c$. Modes higher than $HE_1$ are not supported by the narrow diameter used in this experiment at the visible wavelength, and are not considered here. The distance d between the two coupling regions is related to the tapered angle $\theta_{OF}$, through the equation:

$$d \approx 2(r_{TM0}-r_{HE1})/\theta_{OF} \quad S(2)$$

here $r_{TM0}$ and $r_{HE1}$ are the corresponding radii of the OF at the phase matching regions. Therefore, by changing the fiber tip angle $\theta_{OF}$, the separation distance between two coupling regions can be varied. FIG. 6A shows the exit mode powers of $TM_0$ and $HE_1$, and the uncoupled light (which turns into a free-space propagating wave and becomes the background noise), at different fiber tip angle ($\theta_{OF}$). As shown by the evolution of mode power in FIG. 6C, a large $\theta_{OF}$ (15°) reduces the weight of $TM_0$ mode because of the early introduction of the $LP_{01}$-to-$HE_1$ tunneling process. On the other hand, a small $\theta_{OF}$ also reduces the overall transmittance of $TM_0$ mode due to the large plasmonic loss (approximately 0.3 dB/µm) after the long propagation distance from the coupling region to the tapered fiber apex. The optimized fiber tip angle for the coupling of 532 nm excitation into a 200 nm-in-diameter AgNW is between approximately 7° to 12°.

Figure 6B:
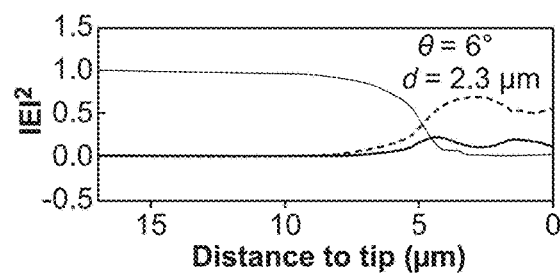
Figure 6C:
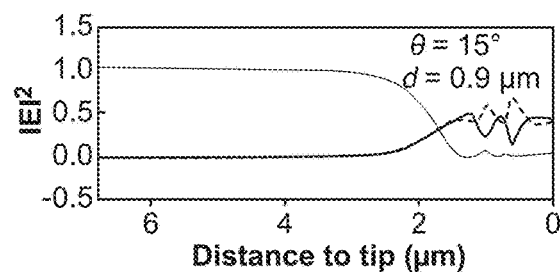
Figure 6D:
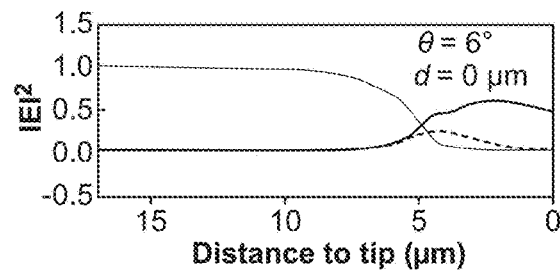

To further demonstrate the role of the separation distance between coupling regions (d) in the selective mode excitation, d was reduced to zero by setting $k_c$ equal to $k_b$ and check its influence on the mode evolution process. The same parameters used in FIG. 6B are recalculated and depicted in FIG. 6D. It clearly shows that in the new evolution, both the $TM_0$ mode (red) and the $HE_1$ mode (yellow) start to grow at the same position (approximately 6 µm from the fiber tip), where the phase matching condition $k_a=k_b=k_k$ is satisfied. Since the $HE_1$ mode has a linearly-polarized mode profile and consequently a larger overlapping integral with the linearly-polarized $LP_{01}$ mode, its mode power increases faster than the $TM_0$ mode power. This simulation unequivocally reveals that the separation of the coupling regions is the key in realizing the selective excitation of the $TM_0$ mode.

Figure 7A:
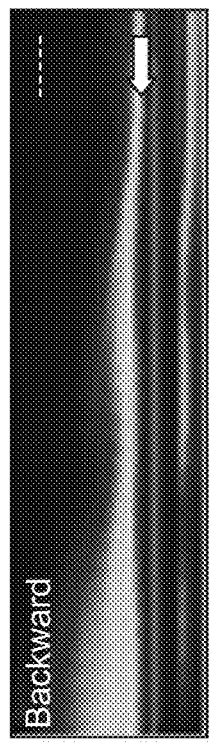
FIGS. 7A-7F is a comparison between numerical simulations and the coupled-mode theory.
Figure 7B:
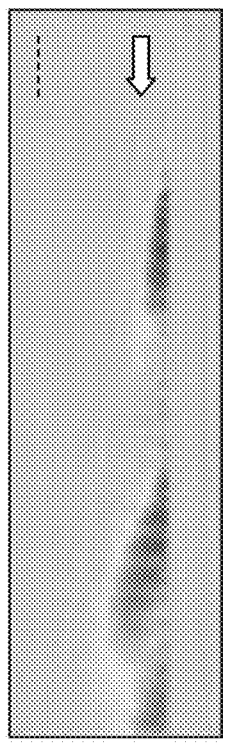
Figure 7C:
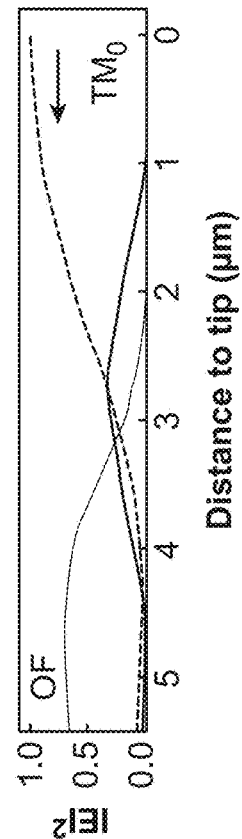
Figure 7D:
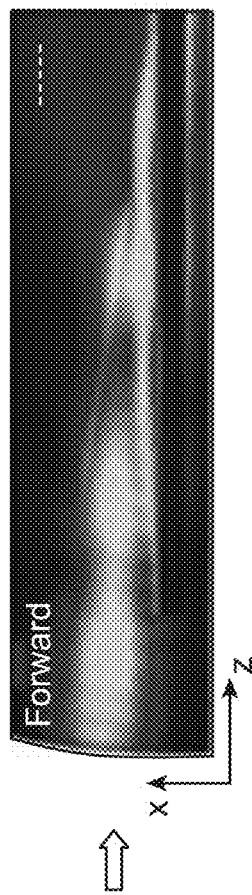
Figure 7E:
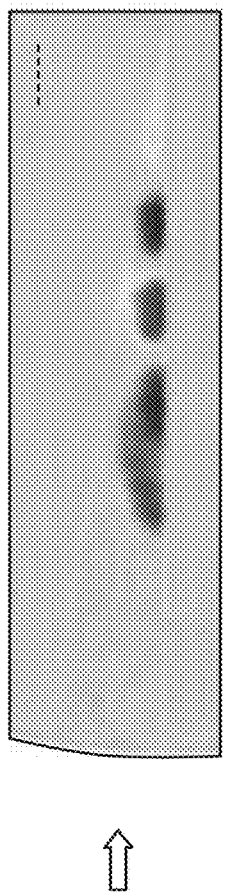
Figure 7F:
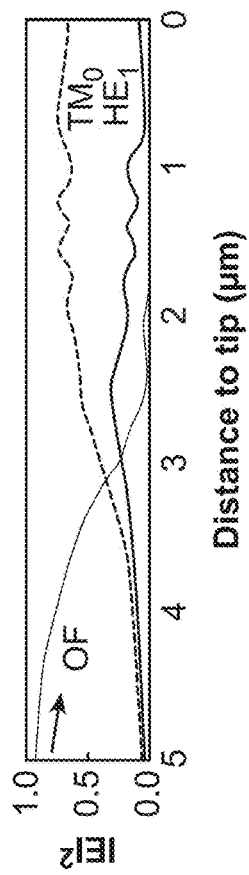

Numerical Full-Wave Simulations and Comparison with the Improved Coupled-Mode Theory FIGS. 7A-7F shows the comparison between the 3D numerical simulation results achieved by the finite element analysis (COMSOL Multiphysics) and the calculated mode evolution from the coupled mode theory. Limited by the computing capability, the length of the AgNW was set to approximately 4 µm to 5 µm and the whole simulation domain was approximately 7 µm in length in the simulations. The left end of the short AgNW induces most of the scattering in FIG. 7A, which could be avoided if longer AgNWs were used. The fiber tip angle $\theta_{OF}$ was set at 90 to move the coupling regions to around 4 µm away from the fiber tip (z=0). As shown in FIGS. 7A and 7D, simulations confirm that both the forward (OF to AgNW) and backward (AgNW to OF) coupling processes can deliver a large portion of the incident power to the adjacent waveguide. The vertical component of the time-averaged Poynting vector (<$S_x$>, FIGS. 7B and 7E) depicts the optical energy flux along $\vec{x}$, which represents the optical power exchange between the three participating modes. For example, the blue region at around z=3 µm in FIG. 7B indicates that strong optical tunneling occurs from the OF downward to the AgNW, which agrees with the mode evolution in FIG. 7C, where the fiber mode power (blue curve) starts to decline at around 3 µm. Similar correspondence is found in the backward coupling process. The fiber mode power starts to rise at around 3.5 µm in the back-coupling process (blue curve in FIG. 7F), which corresponds to a red region in FIG. 7E. It is worth noting that the power exchange between the $TM_0$ mode and $HE_1$ mode can also be observed in <$S_x$>, since they have different intensity profiles and their coupling induces energy redistribution within the plane perpendicular to the AgNW waveguide. The $TM_0$-$HE_1$ coupling arises near the fiber tip (between 1 µm to 3 µm), which generates a red and a blue region in FIG. 7B and a red region centered at 1.5 µm in FIG. 7E. This coupling process is similar to the stimulated Raman adiabatic passage (STIRAP) in waveguides, where two waveguide modes (here $TM_0$ and $HE_1$) utilizes a third waveguide (here the leaky OF mode) as a bridge to exchange powers. The optical energy temporarily stored in the $HE_1$ mode is later coupled into the OF as well, at its phase-matching region.

In all the numerical calculations in this work, the optical property of Ag was adopted from Johnson's & Christy's Data, and the permittivity and Young's modulus of $SiO_2$ are 2.15 and 70 GPa, respectively.

Scattering Loss During the Coupling Process

In the improved coupled-mode modeling, the scattering loss from the OF to the free space is ignored, and only three modes ($LP_{01}$, $TM_0$, and $HE_1$) are considered. This assumption is valid if the scattering loss is low and negligible.

Beside of the cross-section images shown in FIGS. 2A-2C, the side-view of the AgNW-OF coupler was examined, as shown in FIGS. 8A-8F. The dark-field optical image in FIG. 8A depicts the location of the AgNW on the tapered fiber. The AgNW tip of the free-standing end acts as a strong scattering spot when the 532 nm laser is sent in through the OF. The intensity profiles recorded by a s-CMOS charged-coupled device (CCD, Zyla 5.5, Andor) camera are shown in FIG. 8C and under logarithmic scale in FIG. 8D (to highlight the scattered light), which confirm that the tip intensity is more than 2 orders higher than the scattered light. This experimental result agrees with the numerical simulation result shown in FIGS. 8E and 8F.

The Roles of $TM_0$ and $HE_1$ Modes in Nanofocusing

Multiple SPP modes are supported in a cylindrical waveguide. Their field distributions all have the term $e^{im\phi}$, where $\phi$ is the azimuthal angle and m denotes the angular quantum number. The $TM_0$ mode and $HE_1$ mode, corresponding to m=0 and ±1 respectively, dominate the SPP excited on a silver nanowire (AgNW) with a diameter ranging from 100 nm to 300 nm. Higher order SPP modes are leaky with these diameters at the visible range. The azimuthal component is a constant in the fundamental mode (m=0), resulting in the radially symmetrical electric field profiles that are tightly bound to the nanowire and show an increasing confinement to the NW surface for a reduced NW diameter. Therefore, the $TM_0$ mode is particularly interesting for nanofocusing. The $HE_1$ mode has a dipole-like mode profile and smaller fractions of field inside the metal, which gives less plasmonic loss and is known as the long-range SPP.

As shown in FIG. 1F, the $HE_1$ mode has a cut-off diameter at around 100 nm for the 532 nm excitation. When the waveguide is below this cut-off diameter, the $HE_1$ mode index is smaller than 1 and can be coupled to the free space, or in another word, become a leaky and unbound mode. FIGS. 9A-9F shows the comparison of the two modes in nanofocusing. When the $TM_0$ mode propagates along the conical waveguide toward the tip apex (FIG. 9A), its wavevector amplitude increases and the mode volume decreases, leading to a nanoscale plasmonic hotspot at the probe apex. The $HE_1$ mode in FIG. 9D, however, has the wavevector amplitude decreases and eventually couples into the free space without generating a significant enhancement at the probe apex.

Figure 9B:
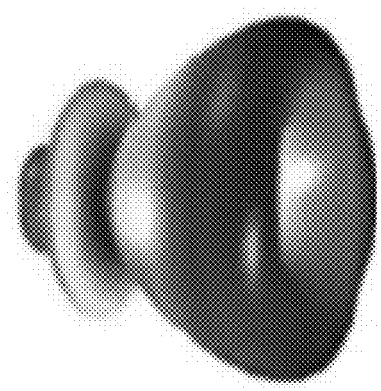
Figure 9E:
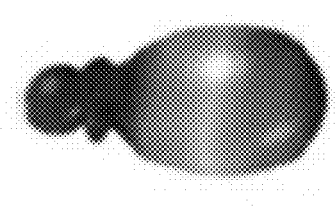
Figure 9A:
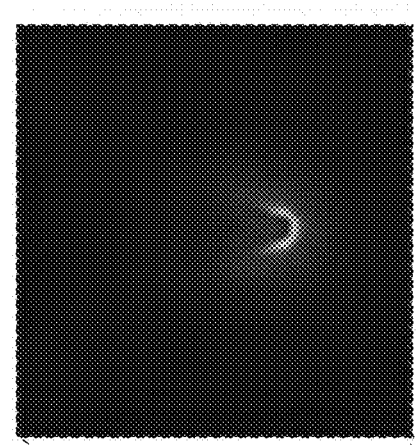
Figure 9A:
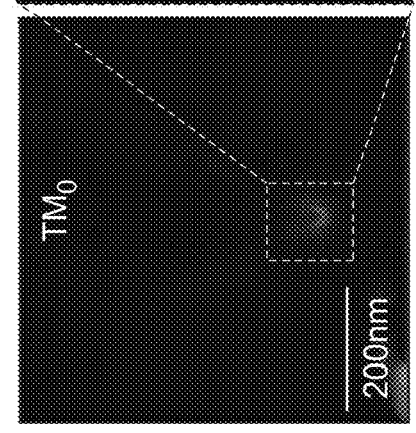
Figure 9D:
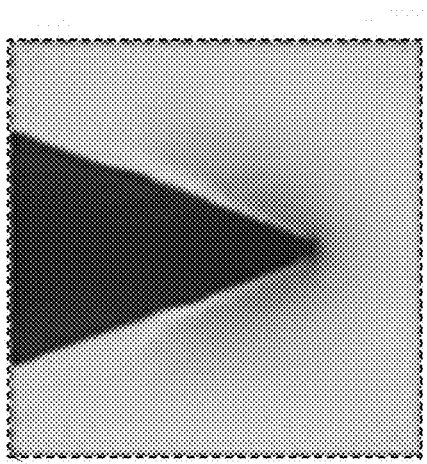
Figure 9D:
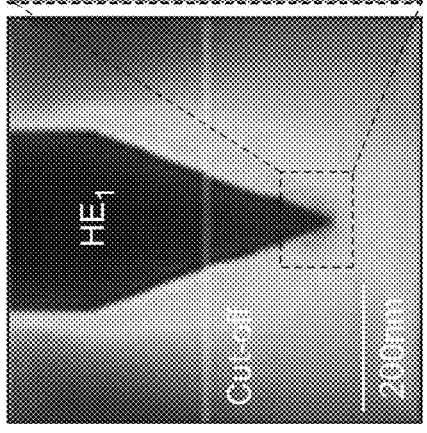

Their far-field radiation patterns also reflect the difference in nanofocusing. The $TM_0$ mode generates an enhanced electric dipole at the probe apex with the polarization along the NW axis direction. Its far-field radiation forms a radially polarized ring pattern, as shown in FIG. 9B. This ring pattern was observed when the $LP_{01}$ mode in the OF had the E-field pointing at the AgNW (FIG. 9C, p-polarization). The $HE_1$ mode, however, has the dipole-like E-field profile and its far-field radiation is a linearly polarized Gaussian beam (FIG. 9E). The $HE_1$ mode can be particularly excited when the E-field of the $LP_{01}$ mode is s-polarized (inset of FIG. 9F). The polarization of the $LP_{01}$ mode is critical in the selective excitation. The two modes give different radiation patterns in the far-field, which can be used to calculate their power distributions.

k-Space Imaging for the Mode-Weight Measurement

Figure 10:
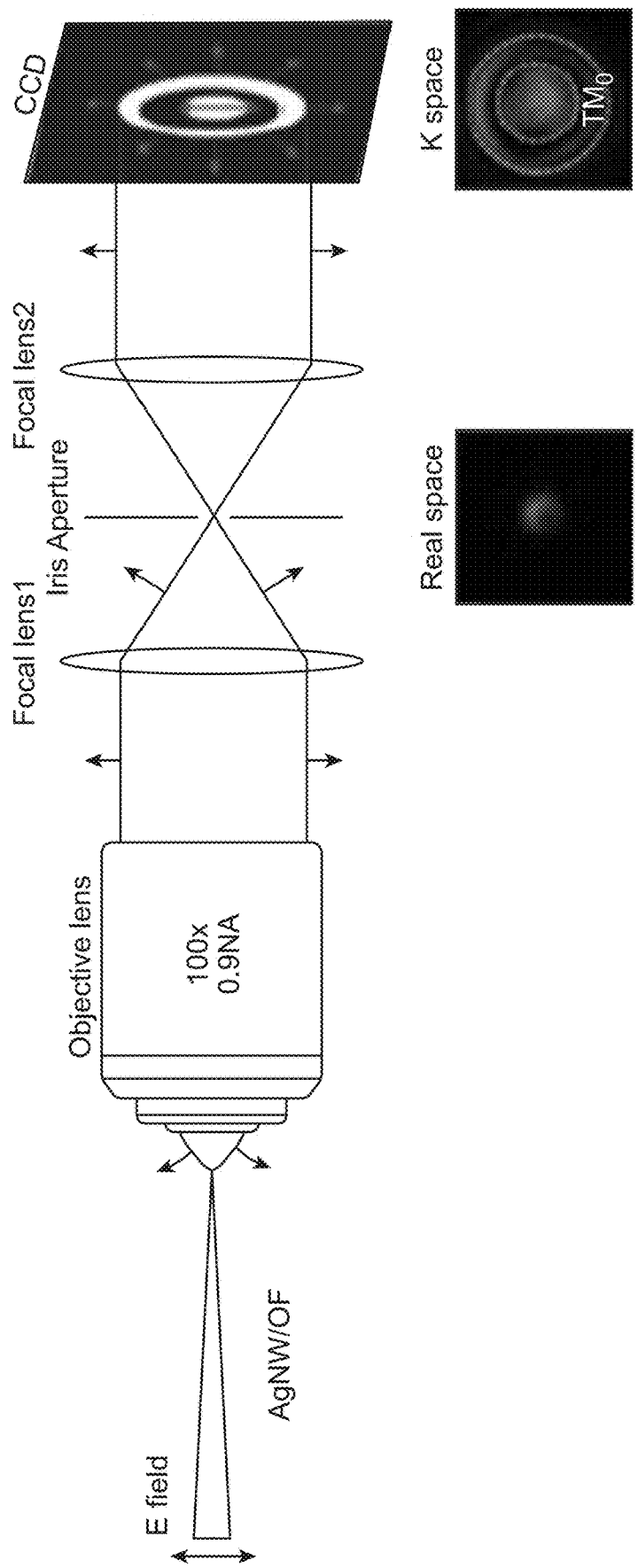
FIG. 10 is a Spatial Fourier transformed far-field radiation pattern (k-space) measurement.

The k-space measurement is carried out on an upright optical microscope that has been modified by introducing an iris aperture at the imaging plane, as sketched in FIG. 10. The AgNW probe is placed in front of the objective lens, with its axis perpendicular to the focal plane. Light scattered from the AgNW tip apex is collected with a high numerical aperture objective (NA=0.9). The spatial Fourier transform of light is imaged by a s-CMOS CCD (Zyla 5.5, Andor) camera placed at the front focal plane of the focal lens 2.

The far-field radiation of the $TM_0$ mode forms a radially polarized beam, as explained in the previous section. Consequently, when focused to the image plane by a low NA lens (f=10 cm), the transverse E-field component dominates at the focused spot and forms a ring pattern (FIG. 10 bottom-left inset). In the k-space, the $TM_0$ mode forms the radially polarized ring, while the $HE_1$ mode forms a spot in the center.

The k-space image can be used to analyze the weight/power of each mode and also the external coupling efficiency in the AgNW waveguide, after considering their collection efficiencies. The mode weights for different AgNW diameter at various wavelengths are shown in FIGS. 4A-4F.

External Nanofocusing Efficiency $N_{ex}$

The external nanofocusing efficiency ($N_{ex}$), defined as the percentage of the input fiber power that can be delivered to the AgNW tip apex, is determined by two factors: the coupling efficiency of the AgNW-OF junction ($N_c$) and the nanofocusing efficiency of the sharp-tip AgNW ($N_{nf}$), through a simple equation:

$$\eta_{ex} = \eta_c \times \eta_{nf} \qquad S(3)$$

Coupling Efficiency $N_c$ Measurement

As shown in FIGS. 11A-11C, the coupling efficiency $N_c$ refers to the percentage of the input power in the OF ($P_{in}$) that can be coupled into the $TM_0$ mode ($P_{TM0}$):

$$\eta_c = P_{TM0}/P_{in} \qquad S(4)$$

Besides of $P_{TM0}$, other channels that consume the input power are the plasmonic/scattering loss during the coupling process ($P_{loss}$), and the $HE_1$ mode power ($P_{HE1}$) that cannot be used for nanofocusing. To measure $P_{in}$ and $P_{TM0}$, the experiment depicted in FIGS. 11A and 11B was carried out. $P_{in}$ was measured by imaging the radiation pattern from a bare tapered OF directly. Unlike a flat OF terminal facet prepared by the standard cleaving method, the tapered OF has a gradual and continuous change in the effective mode index (momentum), which reduces the reflection to almost zero. Moreover, the radiation angle of the tapered OF is approximately 12°, which can be fully collected by the objective lens (NA=0.9). Therefore, $P_{in}$, recorded by the CCD camera can be used to represent the optical power in the fiber.

$P_{TM0}$ can be calculated from the optical power radiated from the AgNW tip and collected by the microscope (named $P_{col,TM0}$), after considering the radiation efficiency ($P_{sc,TM0}/P_{TM0}$) and the collection efficiency ($P_{col,TM0}/P_{sc,TM0}$). The coupling efficiency $N_c$ can be written as:

$$\eta_c = \frac{P_{TM_0}}{P_{in}} = \frac{P_{col,TM_0}}{P_{in}} \bigg/ \left( \frac{P_{col,TM_0}}{P_{sc,TM_0}} \cdot \frac{P_{sc,TM_0}}{P_{TM_0}} \right) \qquad S(5)$$

The ratio of the measured $TM_0$ output power to the input power $$\frac{P_{col,TM_0}}{P_{in}}$$

was 25% for 532 nm, 41% for 633 nm, and 38% for 671 nm. The corresponding total collection efficiencies $$\left( \frac{P_{col,TM_0}}{P_{sc,TM_0}} \cdot \frac{P_{sc,TM_0}}{T_{TM_0}} \right)$$

are 63%, 56%, and 58% for the sharp-tip AgNW (tip angle approximately 40°) used in the measurement. Consequently, the coupling efficiencies $N_c$ are 40%, 72%, and 66%, for 532 nm, 633 nm, and 671 nm, respectively. It is worth noting that by normalizing $P_{col,TM0}$ with $P_{in}$, the influences from the equipment can be canceled, such as the transmittance of the objective lens and the quantum efficiency of the CCD camera.

Nanofocusing Efficiency $N_{nf}$ of Sharp-Tip AgNWs

As theoretically proposed by Pile and Gramotnev, symmetric SPP modes (with respect to the charge distribution across the waveguide) propagating towards the tip of the wedge/groove/edge can have both the phase and group velocity reduce towards zero. Unlike the $HE_1$ mode, the $TM_0$ mode has axisymmetric E-field and charge distribution and can potentially be adiabatically focused to the probe apex.

Figures 12A, 12B, 12C:
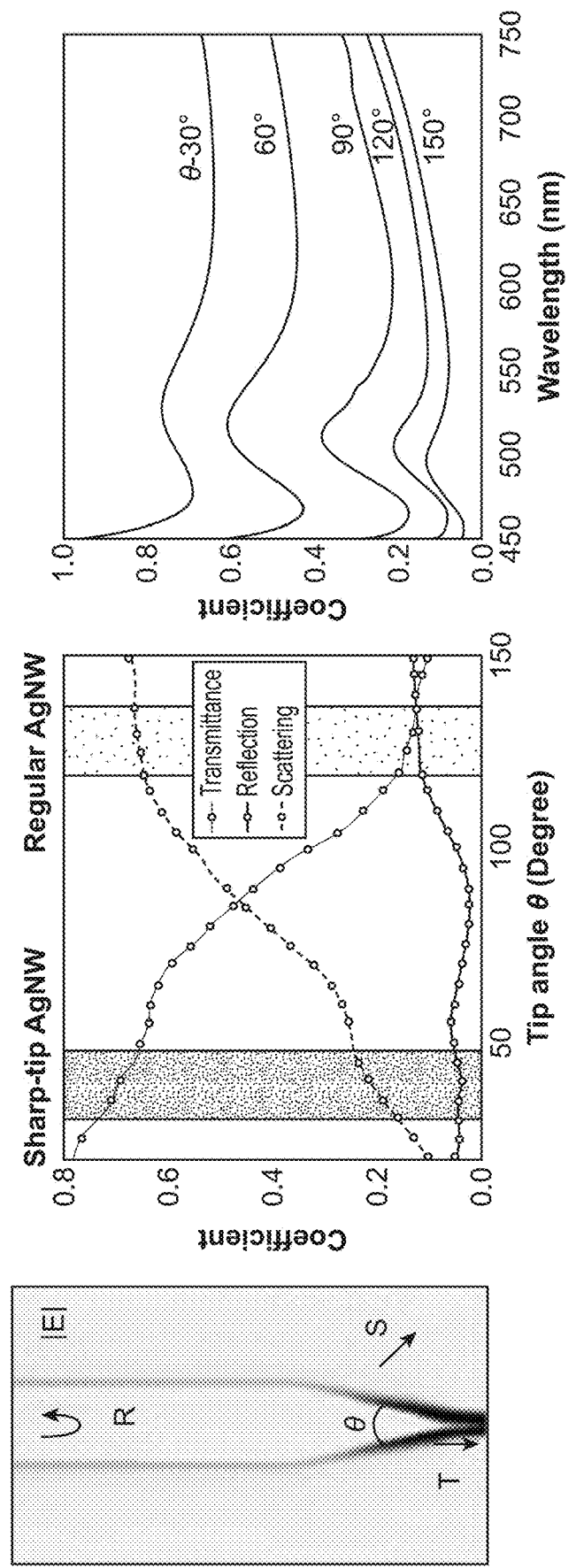

However, the adiabatic approximation for high-efficiency nanofocusing requires the insignificant variation of the wave number of the propagating plasmon along the propagation direction:

$$|d(k_z^{-1})/dz| \ll 1$$

where $k_z$ is the z component of the real part of the wave vector of the $TM_0$ mode plasmon. To satisfy this requirement, the tip angles in the reported works mostly fall in the range of approximately 2° to 6°. The chemically etched AgNWs have sharp ends with tip angles between approximately 30° to 50°, leading to a relatively fast changing rate of $k_z$ and consequently, large scattering loss compared with the adiabatic nanofocusing. Here, the FEA method (COMSOL Multiphysics) was used to evaluate the scattering loss during the nanofocusing process. The model used in the simulation to mimic the tapered AgNW tip is a tapered mode coupler (with tip angle θ) connecting the AgNW waveguide (200 nm in diameter) with a narrow Ag waveguide (10 nm-in-diameter), as shown in FIG. 12A. The transmittance, scattering loss and reflection ratio of a $TM_0$ mode launched on the AgNW are plotted in FIG. 12B. Compared with regular AgNWs with tip angle of around 120°, the sharp-tip AgNWs (θ between 30~50°) increase the transmittance (nanofocusing efficiency) of 532 nm excitation from approximately 10% to approximately 70%.

The overall external nanofocusing efficiency $N_{ex}$ from the OF mode to the AgNW tip apex is thus the product of the fiber-to-AgNW external coupling efficiency (~70%) and the nanofocusing efficiency (~70%), which is about 50%.

Fiber-in Fiber-Out (FIFO) Loss

The theoretical and experimental demonstrations of the high-efficiency selective coupling propose that a fiber-in fiber-out configuration can be used for near-field optical characterizations. In order to demonstrate its feasibility, the transmission of two tapered OFs that are connected via a silver nanowire (AgNW) were measured, which reflects the overall coupling efficiency of FIFO configuration.

Figure 13B:
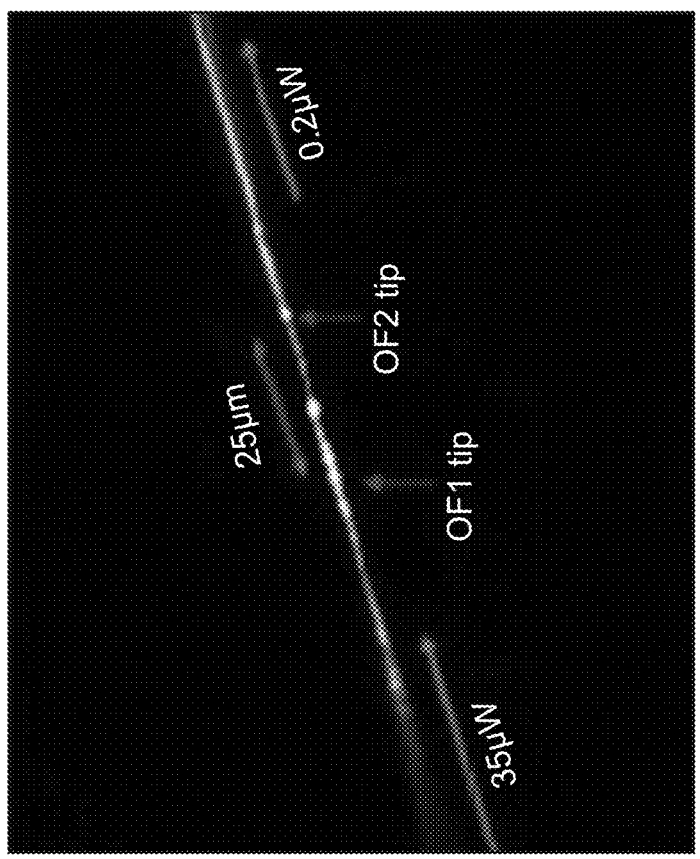
Figure 13A:
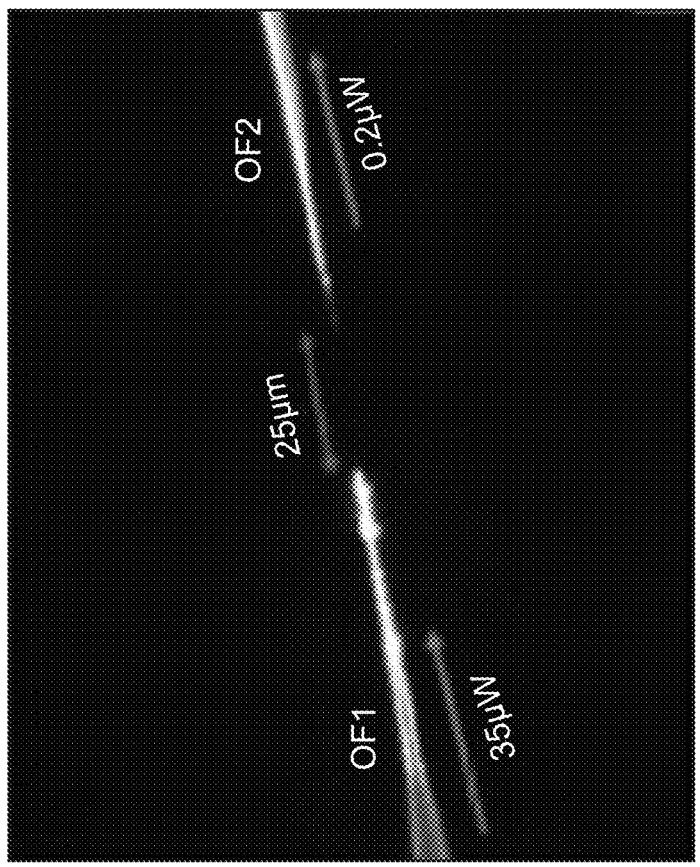

FIGS. 13A and 13B show the experiment to measure the FIFO efficiency. Two identical tapered OFs (OF1 and OF2) were aligned parallel and placed tip to tip, leaving a 25 μm gap in between. The incident light (532 nm) sent in bare OF1 was firstly measured by an optical powermeter (PM320E with S120C photodiode sensor, Thorlabs). When the input power was 35 μW in OF1, the output power from OF2 (without AgNW) was around 0.2 μW. This light originated from the direct coupling of two bare tapered fibers and was subtracted from future measurements. In the second measurement shown in FIG. 13B, a AgNW with a diameter of approximately 200 nm was firstly mounted onto OF2, which was then used as a handle to mount the other end of the AgNW to OF1. The output power from OF2 (with the AgNW) increased to 2.5 μW. Therefore, the total transmittance is 6.5% (~11.8 dB). After deducting the plasmonic loss on the AgNW waveguide (0.3 dB/μm×25 μm=7.5 dB), the two AgNW-OF couplers each contribute approximately −2.2 dB optical loss, which corresponds to approximately 60% in transmittance. This result is higher than the direct measurement result in FIG. 3 (approximately 40%), which may due to the contribution of $HE_1$ mode that has longer propagation length.

$TM_0$-Mode-Enhanced Fluorescent Radiation Analysis

In this simulation, a classical oscillating electric dipole p was placed close to the AgNW tip apex to calculate the radiation enhancement, to examine the role of the $TM_0$ mode in the radiation process. This theoretical treatment has been proven to be an excellent model in both theoretical and experimental reports. As shown in FIGS. 14A-14C, the total energy transfer rate $r_{tot}$ from an electric dipole place at the vicinity of probe apex can be considered as the sum of the nonradiative rate $r_{nr}$ and the radiative rate $r_r$. The nonradiative channel $r_{nr}$ mainly accounts for the ohmic loss in the AgNW and the metallic substrate, and a small portion of high-wavenumber SPP that cannot be conducted either by the AgNW waveguide or the metal surface. The radiative channel $r_r$ includes three parts: the radiation into the 1D-SPP along the AgNW ($r_{AgNW}$, mainly in $TM_0$ mode), the 2D-SPP along the metal substrate ($r_{sub}$), and the direct coupling into the scattered light in free space ($r_{sc}$), which can be written as:

$$\Gamma_{tot}=\Gamma_r+\Gamma_{nr}$$

$$\Gamma_r=\Gamma_{AgNW}+\Gamma_{sub}+\Gamma_{sc}$$

In conventional TERS instruments with side-illumination and collection, the $r_{sc}$ channel is utilized for the signal detection. The drawbacks of this method are the limited ratio of $r_{sc}$ over $r_r$, and the implicitly limited numerical aperture (NA) for detection. To improve the collection efficiency, parabolic mirrors have been introduced[14], where the optical alignment is challenging. The radiation channel along the metallic probe in the form of SPP, here marked as $r_{AgNW}$, has been overlooked due to the difficulty in coupling them back into the far-field propagating waves. Although theoretical research has pointed out the importance of this radiation channel, to the best of our knowledge, it has not been used for radiation signal detection before. These high-wavenumber SPP modes that eventually dissipate into heat are generally considered as a major contribution to the quenching effect.

FIGS. 14A-14C show the contributions of each radiative channel, with the numbers outlined in Table 1. Two configurations are considered here: AgNW-dipole-dielectric substrate configuration (Regular) and AgNW-dipole-metal substrate configuration (gap mode). The first one is to mimic near-field imaging techniques including scattering-NSOM and near-field photoluminescence imaging, and the second one is to imitate the TERS measurement. In accordance with an aspect, it was found that in both cases, the 1D-SPP channel along the AgNW dominates the radiative decay, which may due to the fact that the high-wavenumber SPP modes near the probe apex have a significantly higher local density of state (LDOS) than the free-space propagating wave mode does. A large portion of the radiation energy is thus dumped into the SPP modes along the AgNW, which can be utilized for near-field imaging with improved signal-to-noise ratios.

TABLE 1

Contribution from each radiative channel

| Configuration | $r_r/r_{tot}$ | $r_{AgNW}/r_{tot}$ | $r_{sc}/r_{tot}$ | $r_{SPP}/r_{tot}$ |
|---|---|---|---|---|
| Regular | 81% | 63% | 5.4% | NA |
| Gap-mode | 92% | 66% | 19% | 7% |

STM Measurement
Probe Preparation
Tapered OF:

In order to achieve a high coupling efficiency from OF to AgNW, the end of the OF must be tapered smoothly and uniformly. Chemical wet etching technique can taper OF with a high quality of sharpness and smoothness and have been commonly used for near-field optical probes. Here, the jacket at the fiber end (Thorlabs, model S405-XP) was cleaved and sonicated in acetone and DI water to remove residues form the surface of the cladding layer. The cleaved fiber end was then immersed in 48% hydrofluoric acid (HF, Sigma-Aldrich) covered with isooctane (≥99%, Fisher-Scientific). The fiber was pulled out of the HF using a syringe pump at a different pulling speed to control the taper angle. The fiber was then washed with DI water thoroughly.

Figure 15B:
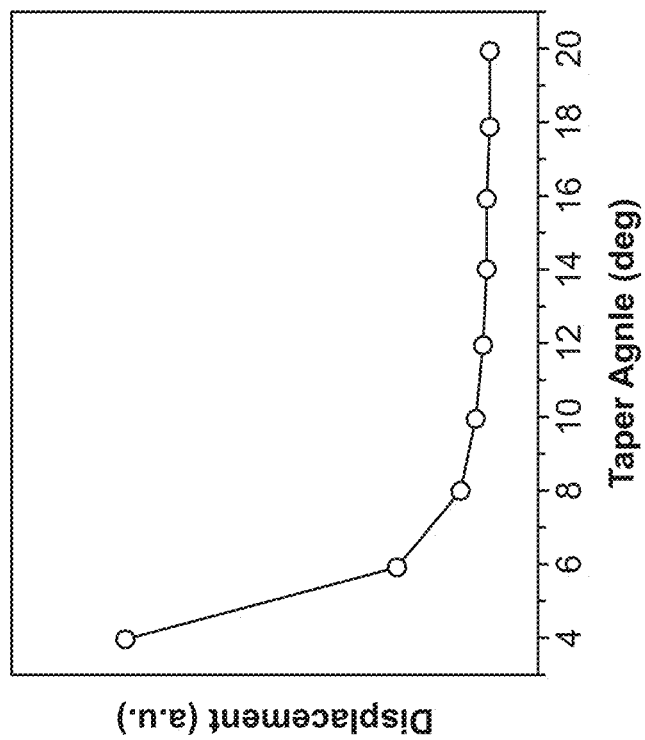
Figure 15A:
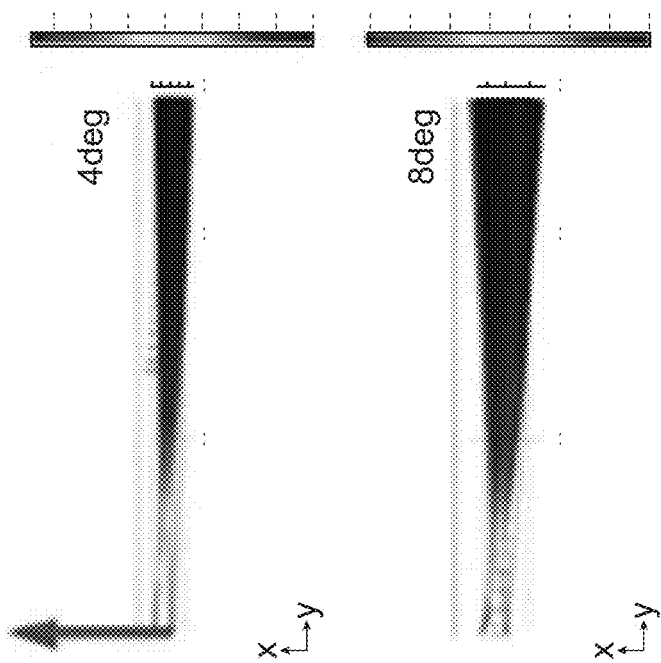

Mechanical Vibration in STM Probe:

Vibrational motion of our AgNW-OF probe due to the external perturbation limits the spatial resolution of both STM and Raman images. Therefore, the vibrational displacement of our waveguide driven by external perturbation must be considered. For our AgNW-OF probe, the protruding length of AgNW from the OF tip is around approximately 1 μm to 2 μm. Compared with the OF (approximately 100 μm for the conical region), the displacement of the NW is negligible. Consequently, FEA modeling (COMSOL Multiphysics) was conducted to calculate the relative displacement of the OF as a function of the taper angle when driven by a vertical force (FIGS. 15A and 15B). The result shows that a significant reduction of the displacement was obtained with a taper angle larger than 60. Considering the range of the taper angle for the efficient excitation of $TM_0$ mode discussed in the session S1 together with the mechanical vibration, the optical fibers with taper angles ranging from approximately 6° to 10° were used for the STM scanning in this work.

AgNWs:

AgNWs longer than 100 μm with diverse thickness were synthesized via polyol-mediated reduction of $AgNO_3$ employing polyvinylpyrrolidone (PVP) to guide one dimensional growth[18]. It is known that the oxidative etching occurs during synthesis and storage, resulting in rounded AgNW tips. In this work, the tip shape of the AgNW must be considered as it determines the nanofocusing efficiency and the spatial resolution in TERS imaging. Accordingly, all AgNWs in this work were synthesized and purified in the deoxygenated solution. 5 ml ethylene glycol in a pear-shaped flask was immersed in a silicone oil bath at 152° C. under stirring (400 rpm), and the flask was purged with nitrogen. While the flask is heated up, 6 ml $AgNO_3$ (0.094M, 99+%, Fisher) and 6 ml PVP (0.147 M, avg Mw #55 000, Sigma-Aldrich) in ethylene glycol (EG, 99%, Fisher) were prepared. After the EG in the pear-shaped flask had been heated and purged for 30 mins, 80 μl $CuCl_2$ (4 mM, 99.995%, Sigma-Aldrich) was added, and the flask was purged for an additional 15 minutes. The 3 ml PVP solution was injected, along with the $AgNO_3$ solution at the injection speed of 125 μl/min using two syringe pumps. After 40 minutes of the injection, the reaction was stopped by removing the flask from the silicon oil bath. After cooling for 15 minutes at room temperature, the AgNWs were purified with deoxygenated ethanol by centrifugation at 800 RPM for 20 minutes at least 5 times. The sharp-tip AgNWs were prepared through a similar method, as detailed in Ref. 20. The synthesized AgNWs have tip angles around 30~50°.

STM Probe Preparation:

In order to reduce the mechanical vibration of the OF, the tapered fiber used for the STM scanning was etched through two steps for different taper angles. In the first step, the fiber was etched without being pulled by a syringe pump. Therefore, a large taper angle was achieved. When the etching process is close to the end, the syringe pump was run to pull out the OF from the HF solution for the reduction of the taper angle. The fiber is then thoroughly rinsed with DI water, and the tip region (approximately 30 μm) was coated with nail polish. After it was dry, approximately 70 nm Au to 100 nm Au was deposited on the fiber through an E-beam evaporator at room temperature with an approximately 0.5 Å/s to 1 Å/s depositing rate. The nail polish at the tip of the OFs was removed by immersing into acetone with gentle sonication and washed with DI water for multiple times. The tapered fiber was then glued onto a short tungsten needle, which has a large mechanical stiffness and is used as a supporter for the fiber. The Au electrode on the OF was then electrically connected with the tungsten needle using silver paste. The tungsten needle was used to hold the fiber in the STM piezoelectric holder in Nanosurf as shown in FIG. S11b.

Experiment Setup

Figures 16A, 16B:
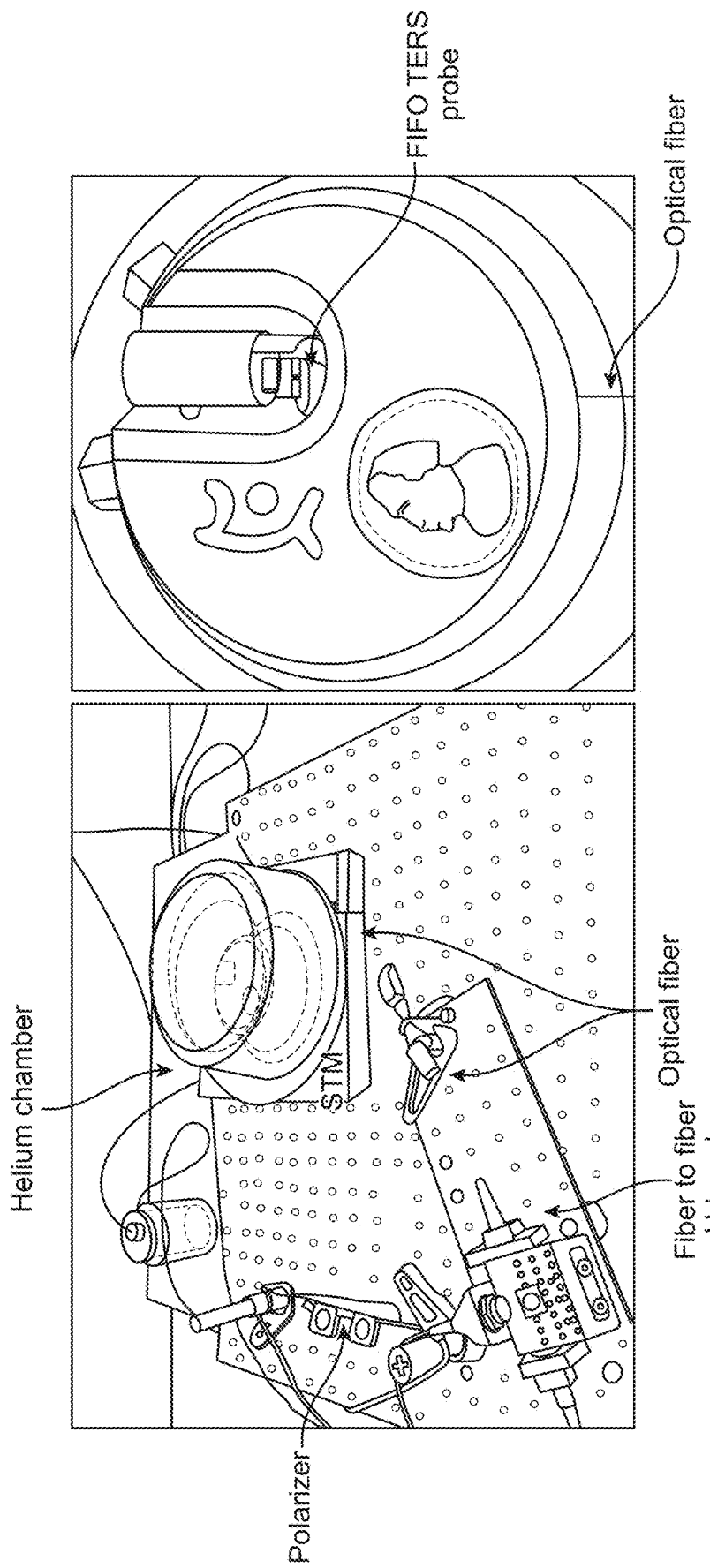
FIGS. 16A and 16B illustrate the FIFO STM-TERS system, and wherein a fiber bench system (U-bench) is used to realize the FIFO configuration, and the FIFO TERS probe was then integrated with a compact ambient STM (NaioSTM by Nanosurf).

The STM-TERS system is composed of a 2-paddle polarization controller, a fiber to fiber U-bench, and the STM in a Helium chamber as shown in FIG. 16A. Using the 2-paddle polarization controller, the incident light was polarized in the direction toward the AgNW to excite $TM_0$ mode. The fiber-to-fiber U-bench consists of a reflecting mirror, (4% reflection of incident light and 96% transmission of the spectrum range of Raman signals) and a long-pass edge filter (>533 nm) as shown in FIG. 5. The STM is covered with double glasses, and the inside was filled with Helium gas. This double-glass Helium chamber can reduce the acoustic noises by approximately 70 dB and increase heat dissipation to improve imaging quality and prevent heat damage to the probe and sample.

TERS Sample Preparation

Monolayer 4-Amonithiophenol (4-ATP):

100 nm Au was deposited on a cover glass using E-beam evaporator at room temperature with an approximately 0.5 Å/s to 1 Å/s deposition rate. The Au film was then incubated in 1 mM 4-ATP (97%, Sigma-Aldrich) ethanol solution for 12 h and then thoroughly rinsed with ethanol.

Monolayer Rhodamine 6G (R6G):

Au substrates were prepared in the same manner as for 4-ATP monolayer. The R6G monolayer was prepared following the described procedure in Ref 21. The samples were prepared by incubating the Au films in the R6G dye molecule solutions ($3\times10^{-4}$M, 99%, Sigma Aldrich) for 6 h. The gold film was then rinsed with ethanol thoroughly to achieve monolayer coverage.

SWCNTs/Au:

100 nm Au was deposited on a freshly exfoliated mica layer with an approximately 0.5 Å/s to 1 Å/s deposition rate using E-beam evaporator at room temperature. The Au/mica layer was then annealed at 350 C.° for 1 hour (1 hr) to achieve the rearrangement of Au. The subsequent gradual decrease of the temperature enables the crystallization of Au into a minimum-energy configuration {111} facet. Finally, the Au film was glued with epoxy to a glass substrate, and it was mechanically peeled off. Single wall carbon nanotubes (conductive aqueous ink, purchased from Sigma-Aldrich) were sprayed on the Au film on a hot plate at 60°. The SWCNTs/Au was gently immersed in DI water and placed in an oven at 80° C. for 1 hour (1 hr) to remove surfactants on the surface of SWCNTs. After cooling it down to room temperature, the water was refreshed by the continuous flow of DI water. Finally, the SWCNTs/Au was dried by blowing gently with a nitrogen gun.

TERS Result Analysis

Maximum Count Per Second (CPS) of TERS R6G

Figure 17:
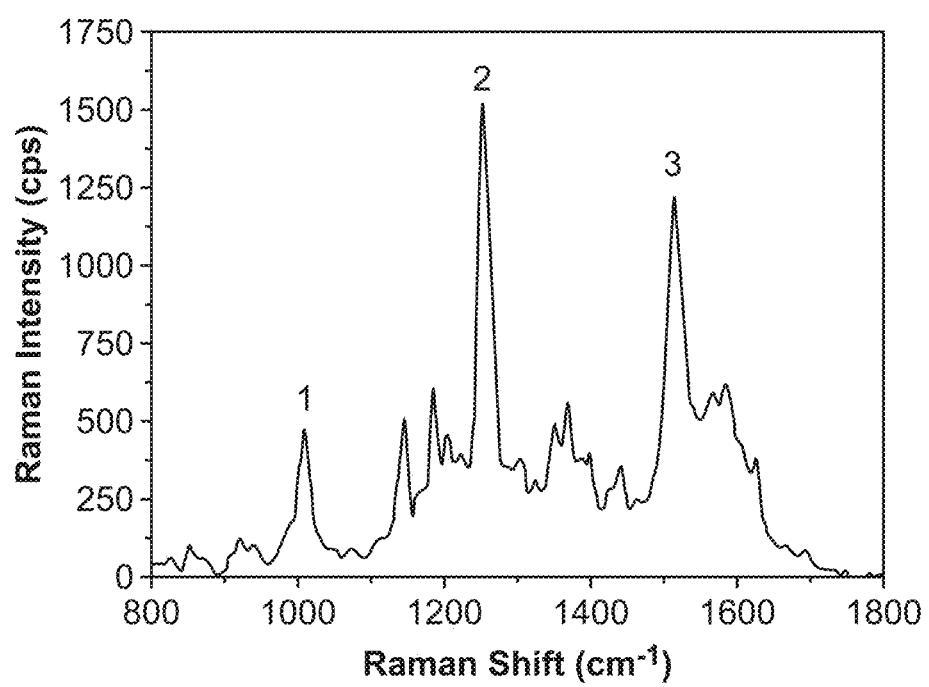
FIG. 17 is a Raman spectra of R6G obtained with FIFO configuration and the assignment of the representative peaks.
Figure 18:
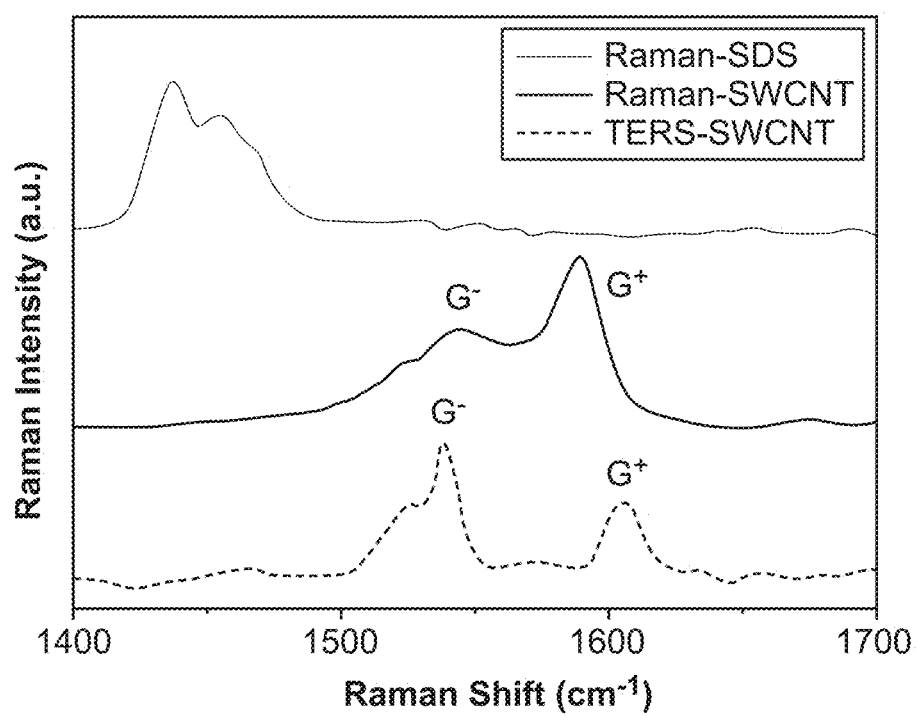
FIG. 18 is a comparison of SWCNT Raman spectra obtained with STM-TERS and conventional Raman apparatus.

The TERS performance of the FIFO nanoscopy was examiner using R6G, which is commonly used for the demonstration of single molecule detection due to its large resonance Raman cross-sections. TERS spectra were acquired at different points with a 532 nm laser (1 μW in fiber) with the AgNW tip tunneling current set at 2 nA (FIG. 17). Although the vibrational modes of R6G observed here have some discrepancies with the typical characteristic peaks due to different charge transfer, local field distribution, and field-gradient in the gap, the Raman peaks here are in the vibrational motion category that has been calculated or observed experimentally: sharp signals at around 1250 $cm^{-1}$, assigned to C—O—C stretching mode, 1500 $cm^{-1}$, assigned to aromatic C—C stretching mode, and other minor peaks at 1009 $cm^{-1}$, 1143 $cm^{-1}$, 1183 $cm^{-1}$, and 1201 $cm^{-1}$, which is associated with different observable vibrational motions. The count per second (cps) of the Raman intensity acquired with our AgNW/OF TERS probe with FIFO configuration can be as high as approximately 1520 cps, which, to the best of our knowledge, is the highest Raman signal intensity obtainable with TERS. This may due to the efficient collection channel (1D-SPP) as discussed herein.

Analysis of SWCNTs Peaks Acquired with FIFO STM-TERS.

FIG. 17 compares the Raman spectra of SWCNTs obtained with conventional Raman spectroscopy with one of our STM-TERS probe with FIFO configuration. The peaks observed with STM-TERS are slightly different from the conventional Raman spectra of SWCNTs. It shows that the $G^-$ and $G^+$ bands (doubly degenerate phonon modes: TO and LO) were shifted and separated from each other. The separation can be understood in the way that the torsional strain induced by the AgNW tip upshifts only the $G^+$ bands toward a higher frequency due to change of the C—C bond lengths in the circumferential direction. On the other hand, the slight downshift of the $G^-$ band mainly originates from the small diameter of the scanned SWCNTs and the shift can be enhanced further due to the slight uniaxial strain which can occur together with the torsional strain. Dynamic temperature variation, together with tightly localization of optical field with a nanoscale cavity at the apex of the AgNW tip may also lead to the further shift of both peaks. New peak originating from the splitting of the $G^-$ band was also observable due to the broken symmetry attributed by the torsional strain. These peaks were not from the surfactants (sodium dodecyl sulfate, SDS) used for the dispersion of the SWCNTs, since the samples were thoroughly washed with both hot and cool DI water after being spread on Au film. Moreover, the Raman spectra of SDS show no peaks in the spectrum range of 1500-1700 $cm^{-1}$ but strong Raman peaks at 1400 $cm^{-1}$ to 1460 $cm^{-1}$, which are assigned for $CH_2$ bending modes.

Optical absorption- and scattering-based hyperspectral imaging at the visible and adjacent ranges denotes one of the most informative and inclusive characterization methods in material research. However, its spatial resolution has been restricted to the diffraction limit and cannot provide the local optical spectral information at the nanoscale, which is strongly dependent on the local physical and electronic properties and plays an increasing role in fields as diverse as electronics, photonics, condensed-matter physics, and material science. Moreover, many of the nanomaterials have highly anisotropic optical properties that are outstandingly appealing yet hard to characterize through conventional optical methods. In this disclosure, a new full-color darkfield near-field scanning optical microscopy for the simultaneous mapping of the absorption and scattering spectra of single-walled carbon nanotubes (SWNT) with sub-3 nanometer spatial resolution is disclosed, and reconstruct the true-color near-field image to reveal the rich near-field spectroscopic information. Both the longitudinal and transverse excitonic resonance-induced light absorption and scattering in the SWNTs are imaged, and the band-structure modulation through strain engineering is studied.

The colors of nanomaterials are determined by the optical absorption and scattering processes that are closely related to their local optical and electronic structures, which can be radically different from their bulk forms. Single-walled carbon nanotubes (SWNT), as an example, comprises a family of more than 200 different structures that are characterized by different chiral indices, endeavored with distinct electronic structures, and known to show a riot of colors as individuals. On the contrary, its bulk forms are the darkest material that absorbs nearly all the light shined on it. Moreover, due to their large surface-to-volume ratios, most nanomaterials have electronical and optical properties closely related to the environmental influence, such as local strain, defects, dielectric screening, quantum effect from particle size, etc. Nowadays, the strain engineering has achieved great commercial success in the semiconductor industry. The need for noninvasive and general diagnostic methods has accelerated the development of optical spectroscopic imaging technique in the past decades, for the providing of multidimensional information by visualizing the spectral-resolved optical images to decipher the local optical properties.

Conventional optical spectroscopic imaging technique has its spatial resolution restricted to micrometer scale due to light diffraction. Although near-field scanning optical microscope (NSOM) offers nanometer-scale resolution by using the plasmonic effect on an optical antenna to scan at the vicinity of the sample surface, its applications in spectroscopy analysis at the visible range compromise the light-matter interaction type within inelastic processes, such as the tip-enhanced photoluminescence (TEPL) or Raman scattering (TERS), where the measurement has sufficient signal-to-noise ratios after the removal of the excitation light by a spectral filter. Recently, the NSOM-based absorption spectroscopy imaging has been demonstrated in the infrared (IR) regime, using spatially coherent light sources such as tunable mid-IR lasers, or a synchrotron radiation beam if a broad bandwidth is desired. Extending the nanospectroscopy imaging technique to the absorption and elastic scattering processes in the visible (VIS) and near-infrared (NIR) range can broaden the scope of applications by removing the hurdle from the requirement of sample luminesces, achieve a stronger signal level by discarding the requirement of coupling the incident light to the vibrations of the system, provide critically important nanoscale details that are associated with the optical and electronical structures, and therefore are highly desired.

In accordance with an embodiment, a strategy is reported for VIS-NIR nanoscale scattering and absorption hyperspectral imaging, and use it to map the electronic transitions in SWNTs with different chiral indices, and investigate the influence of local strain to the band structure modulation. A broad-spectrum ('white') nanoscale light source, created from the tungsten-halogen-lamp light delivered through high-external-efficiency broadband nanofocusing, is formed at the tip apex of a silver nanowire (AgNW) scan probe for the illumination on samples at near field. The nanofocusing process utilizes the selective mode coupling from the light in an optical fiber (OF) to the surface plasmon polaritons (SPPs) in the AgNW waveguide and the adiabatic nanofocusing of SPP at the AgNW tip, and neither of the two steps requires spatially or spectrally coherent light sources. The high nanofocusing efficiency provides an intensive nanoscale light source that can shorten the spectrum integration time at each pixel to less than one second. With this generalized approach, it can be demonstrated that both the longitudinal and transverse excitons in a SWNT deposited on a quartz substrate can be identified through their distinct far-field radiation features, and be imaged with a spatial resolution better than 3.3 nm. Colored near-field images can be achieved through the reconstruction of the hyperspectral image information. More importantly, the intrinsic electronic structure variation induced by the local strain in a structured SWNT can be mapped out.

Figure 19B:
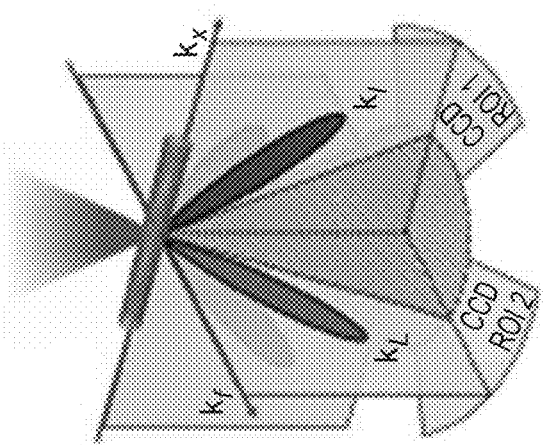
Figure 19C:
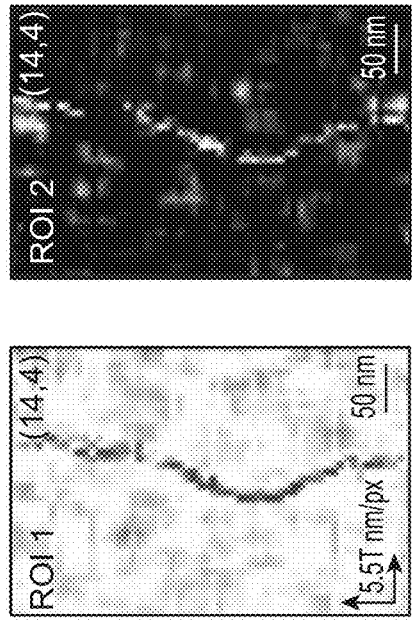
Figure 19A:
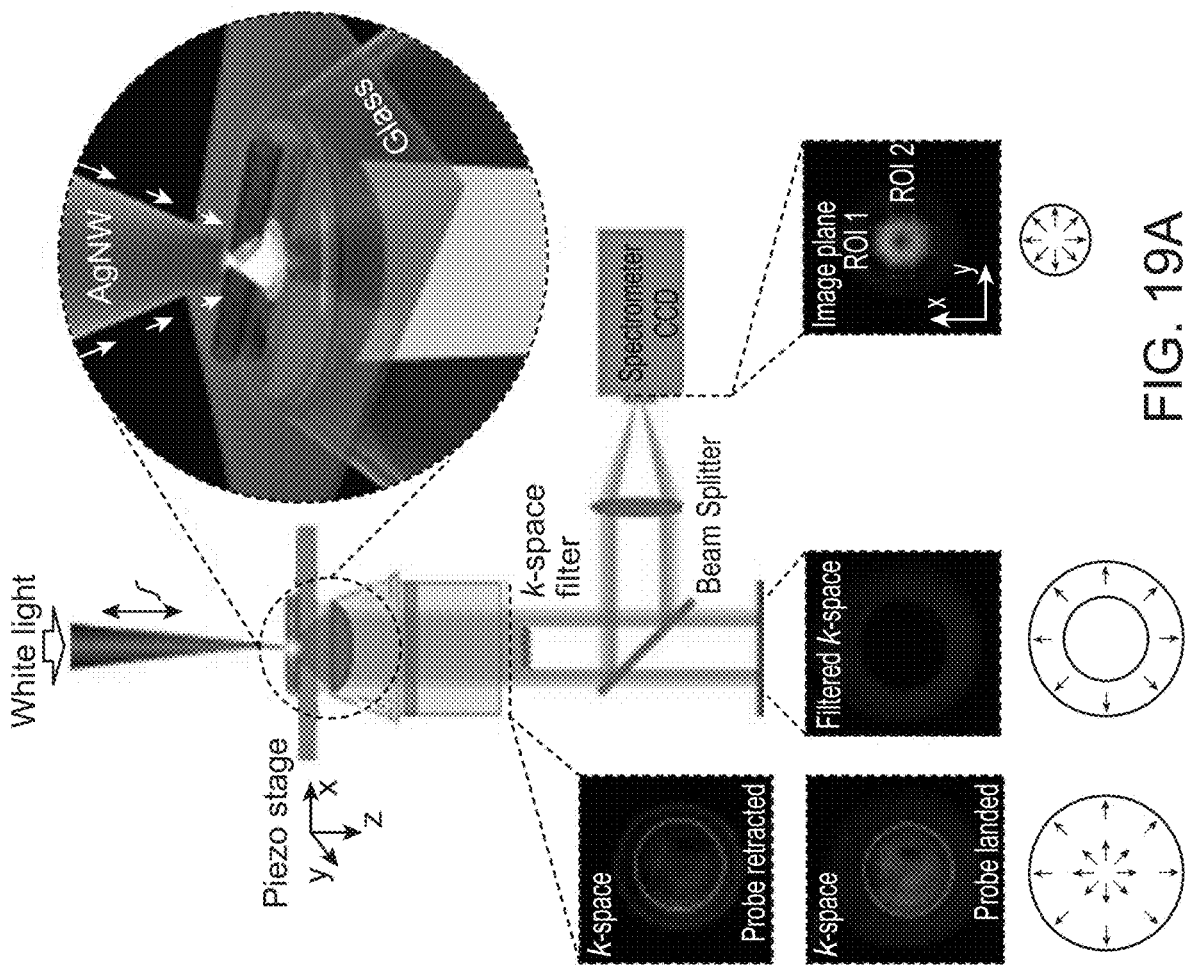

The experiment setup can be considered as a dark-field NSOM configuration, as illustrated in FIGS. 19A-19C. The radially polarized SPP in the AgNW waveguide probe is quasi-adiabatically focused by the sharp tip (FIG. 19A zoom-in), forming a plasmonic hotspot at the tip apex (tip radius approximately 5 nm) with both strong parallel and perpendicular electric field components with respect to the sample surface. The far-field radiation pattern of the radially-polarized mode from a such conical-shaped antenna is also conical, with the first-null beam-width of the major lobe as small as around 45°, fully falling in the circled region in the k-space image (bottom-left panel of FIG. 19A). Further k-space measurements confirmed its radial polarization over the working wavelength range. Tapping-mode atomic-force microscopy (AFM) was adopted in the measurement. Compared with the shear-force control where the probe-sample distance is around 10 nm, the tapping mode allows to bring the hotspot closer to the sample for a better spatial resolution. During the scan, the electrical dipole at AgNW tip apex periodically approaches the sample/substrate and induces a strong image dipole in them. The interaction between the probe and the image dipoles drastically increases with the decrease of tip-sample distance and generates the side lobes in the far-field radiation pattern (FIG. 19B) that contain high-spatial sample-related information. A k-space filter is inserted into the optical path to remove the low-k components, leaving the high-k information focused by an objective lens to form a ring pattern at the image plane, which is sent into the charge-coupled device (CCD) of a spectrometer for analysis.

The intensity distribution of the radial-polarized ring pattern at the image plane is sensitive to the optical anisotropy in a system. Conventionally, optical anisotropy results in the polarization variation from the incident light, which has been exploited to investigate a wild range of materials from molecules to crystals. In the radial-polarization participated absorption and scattering processes, optical anisotropy in the sample alters the rotationally symmetric far-field radiation pattern, which is reflected in the intensity variation along the azimuthal direction of the ring in the image plane. Specifically, a SWNT placed along x direction has a strong depolarization effect from the longitudinal excitons that absorb the far-field radiation from the probe along x direction (noted as $k_\parallel$), which can be measured by selecting the region of interest 1 (ROI 1) in the CCD image plane. Meanwhile, the light scattered from the SWNT resembles the quadrupole radiation in classical radiation theory, originating from the stimulated SWNT quadrupole containing two electric dipoles with opposite polarities, induced by the projection of the electric field in the superfocused SPP mode on x axis. The scattering spectrum can be measured by choosing ROI 2. The nanoscale spectroscopy information acquired from ROI 1 and 2 can be used to reconstruct the nanoscale transmission and reflection color images of the object, which have complementary colors as shown in FIG. 19C. Such dichroic effect is well known in nanoparticle systems, as it had been utilized to make Lycurgus cups in the $4^{th}$ century to illustrate different colors through transmission and reflection.

For hyperspectral nanoimaging, the spectra of both ROIs were recorded simultaneously at each pixel of a 2D area that contains a pristine SWNT prepared on a thin quartz substrate through chemical vapor deposition (CVD). In FIGS. 20A and 20C, a set of representative scattering and absorption hyperspectral images are shown, with the spectrum range covering from 415 nm (2.98 eV) to 980 nm (1.26 eV) when using a tungsten-halogen light source (SLS201L, Thorlabs). The averaged spectra (FIG. 20B) contain well-resolved and separated features, which indicate the van Hove singularities (VHS) in the local density of states (DOS) in the SWNT system. Compared with the valleys in the absorption spectrum (508 nm, 733 nm and 857 nm), the peaks in the scattering spectrum (490 nm, 714 nm and 838 nm) are red shifted by approximately 20 nm. This difference may originate from the different mechanisms behind the two processes. In the absorption process, the signal strength is proportional to the imaginary part of the SNWT permittivity $\varepsilon(\omega)$. While in the scattering process, the scattering strength scales quadratically with the induced electric momentum $|\varepsilon(\omega)-\varepsilon_{av}|^2$, where $\varepsilon_{av}$ is the averaged permittivity of the environment. The SWNT can be clearly identified in the monochromatic images at the VHS wavelengths. It is worth noting that the measured spectrum range is beyond the nominal single-mode range of the optical fiber (SM600, Thorlabs). At the non-single-mode range, the high-order mode in the optical fiber tends to excite the dipole-like SPP mode in the AgNW waveguide, which has a small far-field radiation angle and is removed by the k-space filter, and thus has negligible influence on the measurement.

Since the detected signals are encoded in the side lobes that originate from the nonlinear near-field coupling between the plasmonic hotspot and its image, the spatial resolution of the technique is higher than the mode volume of the plasmonic hotspot at the tip apex, which is roughly the same as the tip radius of the AgNW probe (approximately 5 nm). The spatial resolution acquired on a 2.3 nanometer-in-diameter SWNT is finer than the piezo scanner resolution (approximately 3.3 nm, FIGS. 20D and 20E).

Figure 22A:
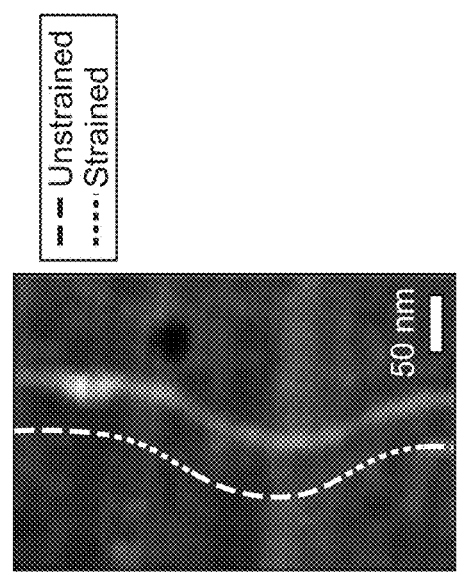
Figure 22B:
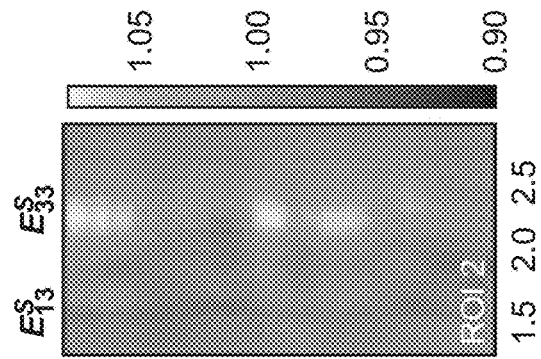
Figure 22C:
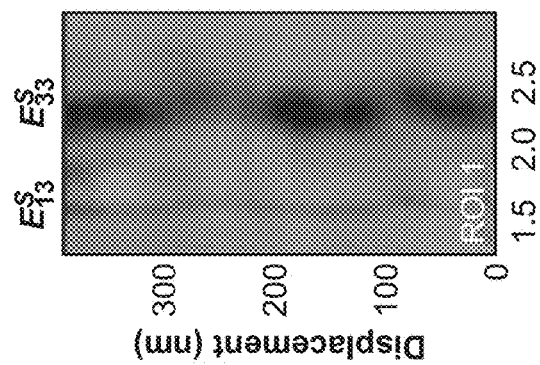
Figure 22D:
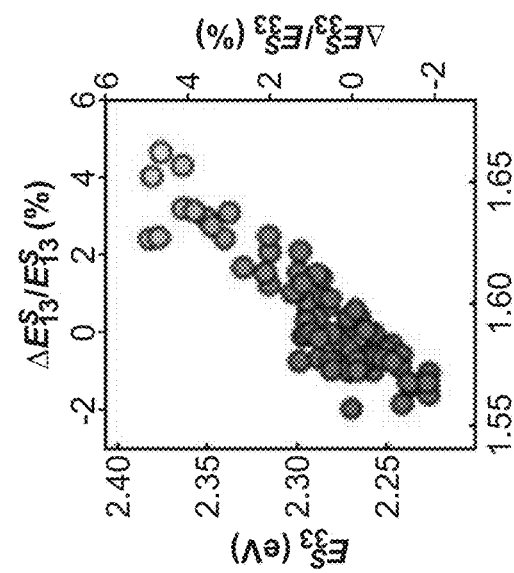
Figure 22E:
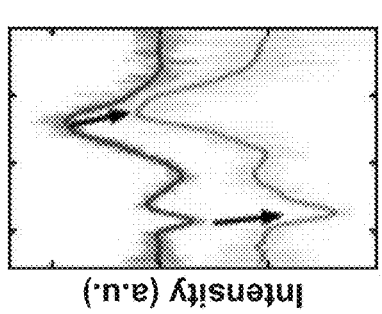
Figure 22F:
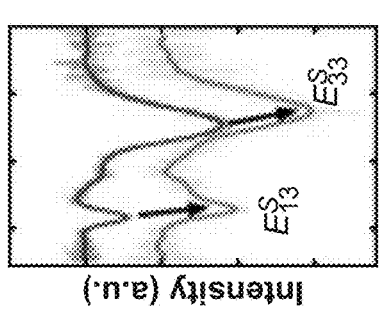

SWNT is one of the ideal quasi-one-dimensional systems and has highly anisotropic optical properties, which can also be found in many other nanomaterials and objects. Due to their one-dimensionality, SWNTs have dominating optical transitions when the incident light is parallel to the SWNT axis, which has been intensively investigated through inelastic (e.g. photoluminescence excitation spectroscopy) and elastic scattering measurements (e.g. Rayleigh scattering microscopy). The perpendicular-polarization Rayleigh scattering, however, cannot benefit from the antenna effect of a SWNT and is merely detectable even by sophisticated designs. FIGS. 21A and 21B illustrate the band structures and indices of a semiconducting SWNT near the Fermi level to describe the optical transitions induced by different excitation polarizations. The excitation from a valence band $n_v$ to a conduction band $n_c$ has the band index difference $\Delta n = n_c - n_v$, which, as required by the selection rule, needs to satisfy $\Delta n = 0$ or $\Delta n = \pm 1$ for incident light parallel or perpendicular to the SWNT axis. These two scenarios have different influences on the far-field radiation pattern and lead to distinct features in the spectra collected from the two ROIs. Specifically, the parallel excitation in FIG. 21A is mainly induced by the horizontal electrical component ($\vec{E}_\parallel$) that is along the SWNT axis. $\vec{E}_\parallel$ excites a surface current along the nanotube, with the radiation field focused onto a rotationally symmetric plane perpendicular to the nanotube axis. Consequently, the light intensity along ky is increased. The spectra acquired from ROI 1 and 2 display opposite characteristics (valleys vs. peaks) at the optical transition frequencies, such as the $E_{ii}$ ($E_{22}^S$, $E_{33}^S$, $E_{44}^S$ ... the superscript s denotes that they are semiconductor-type SWNTs) in FIG. 21C. The perpendicular excitation, however, has the absorption process stronger than the scattering process and shows valleys along both kx and ky, such as the $E_{ij}$ ($E_{12}^S$, $E_{13}^S$, $E_{24}^S$ ..., degenerated with Eji) transitions. These characteristics can be clearly identified in all SWNT scan results. FIGS. 21F and 21G depict the Kataura plots for $\Delta n = 0$ or $\Delta n = \pm 1$ transitions, for the visualization of the relationship between the optical transition energies and chiral indices of the SWNTs. The SWNT diameters are determined by the measured radial-breathing mode (RBM) frequencies, and the corresponding optical transition energies are marked by green ($\Delta n = 0$) and orange ($\Delta n = \pm 1$) squares, referring to the parallel and perpendicular excitations, respectively. In accordance with an aspect, it was noticed that that the perpendicular-excitation transition is more prominent in small-diameter SWNTs, while in the large-diameter ones, the features may be buried by the stronger signals from the parallel excitation. The nano-hyperspectral imaging technique provides a direct measurement to map the band structure of nanomaterials, and can be used to investigate the influence from environments, such as local strains. Strain engineering is as an effective way to tune the band structures and further tailor the electronic and optical performance of SWNTs (18). Currently, there are only a few indirect methods, such as tip-enhanced Raman scattering (TERS) imaging that have been employed to provide nanoscale strain information in low-dimensional materials. Such information can be used to estimate the band structure variation. FIG. 22A shows the topographical image of a curved (14, 4) SWNT structure, physically deformed by a contact-mode AFM nanomanipulation method with the AFM probe scratching the SWNT from the right to the left in the middle region. After scratching and relaxing the SWNT, tapping-mode DF-NSOM was used to record the SWNT band structure. FIGS. 22B and 22C depict the absorption and scattering spectra of the points along the nanotube, where the strain induced optical transition shifts were mainly found in the transition regions between the straight and the curved SWNT (green dashed curves). In the middle of the curve, however, the strain was eliminated, presumably due to the limited friction force between a SWNT and the quartz substrate and the consequent sliding of the SWNT during the relaxation process that remove the uniaxial strain locally. At the strained regions, both the parallel-excitation transition energy $E_{33}^S$ and the cross-excitation $E_{13}^S$ blue-shift to larger band gaps which echoes with the modulo type of the nanotube. Further study on the transition energy correlation reveals a linear relationship between $E_{33}^S$ and $E_{13}^S$, as shown in FIG. 22D, with a slope of $E_{33}^S/E_{13}^S$. This is because that the influence of a uniaxial strain to the band structure can be through decreasing the SWNT radius R.

In accordance with an embodiment, a universal nano-hyperspectral imaging method is demonstrated, which provides a powerful tool for the characterization of anisotropic optical properties at nanometer scale, in our case providing direct insights into the strain-induced band structure variation along a SWNT. By improving the power density of the light source, such as switching the thermal lamp to a supercontinuum white light laser, high-speed imaging up to one frame per second is possible. The fiber-based nature also offers the flexibility to perform the measurement under cryogenic environment. In accordance with an aspect, the technique pushes the ultraviolet-visible spectroscopy imaging into the nanometer regime, and can potentially shine the light on catalysis, quantum optics, nanoelectronics, and more.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for generating a high-intensity light source at a probe tip, the method comprising:
   exciting a $TM_0$ mode of a surface plasmon polariton (SPP) in a sharp-tip metal nanowire (AgNW) waveguide with a linearly-polarized mode ($LP_{01}$) in a tapered optical fiber (OF); and
   compressing the $TM_0$ mode through a chemically-sharpened taper to a tip apex of the sharp-tip silver nanowire (AgNW).

2. The method according to claim 1, further comprising:
   selectively exciting the $TM_0$ mode by physically separating coupling regions for the $TM_0$ mode and a $HE_1$ mode.

3. The method according to claim 2, wherein the $TM_0$ mode has a higher effective mode index than other SPP modes, and incident light in the tapered optical fiber runs into a phase-matching region for the $TM_0$ mode first, and uncoupled light remaining in the tapered optical fiber propagates into a phase-matching region for the $HE_1$ mode.

4. The method according to claim 1, wherein an angle of the tapered optical fiber is 6° to 12°.

5. The method according to claim 1, wherein the sharp-tip nanowire protrudes 1 μm to 2 μm from a tip of the tapered optical fiber and the sharp-tip silver nanowire has a tip angle of 30° to 50°.

6. The method according to claim 1, further comprising:
   removing low-k components by inserting a k-space filter into an optical path;
   focusing high-k information with an objective lens to form a ring pattern at an image plane; and
   sending the focused high-k information into a charge-coupled device (CCD) of a spectrometer for analysis.

7. A probe comprising:
   a tapered optical fiber (OF) configured to excite a $TM_0$ mode of a surface plasmon polariton (SPP);
   a sharp-tip metal nanowire waveguide arranged on a sidewall of the tapered optical fiber; and
   wherein a taper to a tip apex of the sharp-tip nanowire is configured to compress the $TM_0$ mode.

8. The probe of claim 7, wherein the sharp-tip metal nanowire is a silver nanowire.

9. The probe of claim 7, wherein the taper to the tip apex of the sharp-tip nanowire is chemically-sharpened.

10. The probe of claim 7, wherein the $TM_0$ mode is selectively excited by physically separating coupling regions for the $TM_0$ mode and a $HE_1$ mode.

11. The probe of claim 10, wherein the $TM_0$ mode has a higher effective mode index than other SPP modes, and incident light in the tapered optical fiber runs into a phase-matching region for the $TM_0$ mode first, and uncoupled light remaining in the tapered optical fiber propagates into a phase-matching region for the $HE_1$ mode.

12. The probe of claim 7, wherein an angle of the tapered optical fiber is 7° to 12°.

13. The probe of claim 7, wherein the sharp-tip metal nanowire protrudes 1 μm to 2 μm from a tip of the tapered optical fiber and the sharp-tip silver nanowire has a tip angle of 30° to 50°.

14. The probe of claim 7, wherein the sharp-tip silver nanowire has a diameter of 100 nm to 300 nm, and an excitation wavelength is 532 nm.

15. The probe of claim 7, wherein the tapered optical fiber includes a gold electrode partially covering the optical fiber for electrically connecting the metal nanowire for imaging.

16. The probe of claim 7, wherein the probe is used Raman spectroscopy imaging, photocurrent imaging, UV-VIS imaging, scanning probe microscopes, atomic force microscopes and/or scanning tunneling microscopes.

17. The probe of claim 7, wherein probe is integrated into an electron microscope for in-situ optical measurement.

18. The probe of claim 7, further comprising:
   a k-space filter, wherein the k-space filter is inserted into an optical path to remove low-k components; and
   an objective lens, the objective lens configured to focus high-k information to form a ring pattern at an image plane, which is sent into a charge-coupled device (CCD) of a spectrometer for analysis.

19. The probe of claim 18, wherein the probe is used for microscopy using linear wavelengths.

* * * * *